United States Patent
Tasoulas et al.

(10) Patent No.: US 10,778,764 B2
(45) Date of Patent: Sep. 15, 2020

(54) SYSTEM AND METHOD FOR EFFICIENT VIRTUALIZATION IN LOSSLESS INTERCONNECTION NETWORKS

(71) Applicant: ORACLE INTERNATIONAL CORPORATION, Redwood Shores, CA (US)

(72) Inventors: Evangelos Tasoulas, Oslo (NO); Feroz Zahid, Oslo (NO); Bjørn Dag Johnsen, Oslo (NO); Ernst Gunnar Gran, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/558,977

(22) Filed: Sep. 3, 2019

(65) Prior Publication Data

US 2020/0014749 A1    Jan. 9, 2020

Related U.S. Application Data

(63) Continuation of application No. 16/051,187, filed on Jul. 31, 2018, now Pat. No. 10,432,719, which is a
(Continued)

(51) Int. Cl.
*H04L 29/08* (2006.01)
*H04L 12/24* (2006.01)
(Continued)

(52) U.S. Cl.
CPC ........ *H04L 67/1095* (2013.01); *G06F 9/4856* (2013.01); *G06F 9/5077* (2013.01);
(Continued)

(58) Field of Classification Search
CPC ............. H04L 67/1095; H04L 12/4625; H04L 41/0816; H04L 45/48; H04L 49/70;
(Continued)

(56) References Cited

U.S. PATENT DOCUMENTS

| 10,230,794 B2 | 3/2019 | Tasoulas et al. |
| 2005/0120160 A1 | 6/2005 | Plouffe et al. |
| | (Continued) | |

FOREIGN PATENT DOCUMENTS

| CN | 101206623 | 6/2008 |
| JP | 2005527898 | 9/2005 |
| JP | 2011028408 | 2/2011 |

OTHER PUBLICATIONS

Guay, et al., "A Scalable Signalling Mechanism for VM Migration with SR-IOV over InfiniBand", 2012 IEEE 18th International Conference on Parallel and Distributed Systems, pp. 384-391, 8 pages.
(Continued)

*Primary Examiner* — Nicholas R Taylor
*Assistant Examiner* — Chong G Kim
(74) *Attorney, Agent, or Firm* — Tucker Ellis LLP

(57) ABSTRACT

Systems and methods for supporting efficient virtualization in a lossless interconnection network. An exemplary method can provide, one or more switches, including at least a leaf switch, a plurality of host channel adapters, wherein each of the host channel adapters comprise at least one virtual function, at least one virtual switch, and at least one physical function, a plurality of hypervisors, and a plurality of virtual machines, wherein each of the plurality of virtual machines are associated with at least one virtual function. The method can arrange the plurality of host channel adapters with one or more of a virtual switch with prepopulated local identifiers (LIDs) architecture or a virtual switch with dynamic
(Continued)

LID assignment architecture. The method can assign each virtual switch with a LID. The method can calculate one or more linear forwarding tables based at least upon the LIDs assigned to each of the virtual switches.

17 Claims, 19 Drawing Sheets

Related U.S. Application Data continuation of application No. 15/210,599, filed on Jul. 14, 2016, now Pat. No. 10,051,054.

(60) Provisional application No. 62/261,103, filed on Nov. 30, 2015, provisional application No. 62/259,831, filed on Nov. 25, 2015, provisional application No. 62/259,321, filed on Nov. 24, 2015.

(51) Int. Cl.

| | | |
|---|---|---|
| *H04L 12/931* | (2013.01) | |
| *H04L 12/753* | (2013.01) | |
| *H04L 12/46* | (2006.01) | |
| *G06F 9/50* | (2006.01) | |
| *G06F 9/48* | (2006.01) | |
| *H04L 12/751* | (2013.01) | |
| *H04L 12/707* | (2013.01) | |
| *H04L 12/803* | (2013.01) | |

(52) U.S. Cl.
CPC ...... *H04L 12/4625* (2013.01); *H04L 41/0816* (2013.01); *H04L 45/48* (2013.01); *H04L 49/70* (2013.01); *H04L 45/02* (2013.01); *H04L 45/22* (2013.01); *H04L 47/125* (2013.01)

(58) Field of Classification Search
CPC ....... H04L 45/02; H04L 45/22; H04L 47/125; G06F 9/4856; G06F 9/5077
USPC ........................................................ 709/223
See application file for complete search history.

(56) References Cited

U.S. PATENT DOCUMENTS

| | | |
|---|---|---|
| 2008/0186990 A1 | 8/2008 | Abali et al. |
| 2008/0189432 A1 | 8/2008 | Abali et al. |
| 2012/0042034 A1 | 2/2012 | Goggin et al. |
| 2012/0307682 A1 | 12/2012 | Johnsen et al. |
| 2013/0114620 A1 | 5/2013 | Bogdanski |
| 2013/0121154 A1 | 5/2013 | Guay et al. |
| 2013/0254321 A1 | 9/2013 | Johnsen et al. |
| 2013/0254424 A1 | 9/2013 | Guay et al. |
| 2013/0262937 A1 | 10/2013 | Sridharan et al. |
| 2014/0064287 A1 | 3/2014 | Bogdanski et al. |
| 2016/0132443 A1 | 5/2016 | Davda et al. |

OTHER PUBLICATIONS

Indian Patent Office, Office Action dated Dec. 5, 2019 for Indian Patent Application No. 6984/CHENP/2014, 5 pages.
Chinese Patent Office, Office Action dated Feb. 3, 2020 for Chinese Patent Application No. 201680003773.2, 13 pages.
Japanese Patent Office, Office Action dated Mar. 3, 2020 for Japanese Patent Application 2017-535006, 5 pages.
United States Patent and Trademark Office, Notice of Allowance dated Apr. 3, 2020 for U.S. Appl. No. 16/269,272, 8 pages.
Liss, Liran, "InfiniBand and RoCEE Virtualization with SR-IOV", Mellanox Technologies, Mar. 15, 2010, 18 pages.
India Patent Office, First Examination Report dated Dec. 10, 2019 for India Patent Application No. 4933/CHENP/2014, 6 pages.
United States and Trademark Office, Office Action dated Dec. 20, 2019 for U.S. Appl. No. 16/269,272, 8 pages.
Indian Patent Office, Examination Report for Indian Patent Application No. 6985/CHENP/2014 dated Jan. 14, 2020, 9 pages.

| | |
|---|---|
| 900 | Virtual Lane (VL) – 4 bits |
| 901 | Link Version (Lver) – 4 bits |
| 902 | Service Level (SL) – 4 bits |
| 903 | LID Extension Flag (LEXTF) – 1 bit |
| 904 | Reserved (R1) – 1 bit - zero |
| 905 | Link Next Header (LNH) – 2 bits |
| 906 | Destination Local ID (DLID) – 16 bits |
| 907 | DLID Prefix Extension (DPF) – 2 bits |
| 908 | SLID Prefix Extension (SPF) – 2 bits |
| 909 | Reserved (R2) – 1 bit – zero |
| 910 | Packet Length (PktLen) – 11 bits |
| 911 | Source Local ID (SLID) – 16 bits |

FIGURE 9

| 912 | Entry 0 indexed by 16 bit DLID = 0, containing standard IB port number |
|---|---|
| | ...                                                              916 |
| 913 | Entry 48K-1, indexed by 16 bit DLID = 48K-1, containing IB port number |

| 914 | Entry 0 indexed by 18 bit DPF + DLID = 64K, containing standard IB port number |
|---|---|
| | ...                                                              917 |
| 915 | Entry 256K-1, indexed by 18 bit DPF + DLID = 256K-1, containing standard IB port number |

FIGURE 10

Providing, at one or more computers, including one or more microprocessors, one or more switches, the one or more switches comprising at least a leaf switch, wherein each of the one or more switches comprise a plurality of ports, a plurality of host channel adapters, wherein each of the host channel adapters comprise at least one virtual function, at least one virtual switch, and at least one physical function, and wherein the plurality of host channel adapters are interconnected via the one or more switches, a plurality of hypervisors, wherein each of the plurality of hypervisors are associated with at least one host channel adapter of the plurality of host channel adapters, and a plurality of virtual machines, wherein each of the plurality of virtual machines are associated with at least one virtual function. — 1810

Arranging the plurality of host channel adapters with one or more of a virtual switch with prepopulated local identifiers (LIDs) architecture or a virtual switch with dynamic LID assignment architecture. — 1820

Assigning each virtual switch with a LID, the assigned LID corresponding to a LID of an associated physical function. — 1830

Calculating one or more linear forwarding tables based at least upon the LIDs assigned to each of the virtual switches, each of the one or more LFTs being associated with a switch of the one or more switches — 1840

FIGURE 18

```
┌─────────────────────────────────────────────────────────────────────────┐
│ Providing, at one or more computers, including one or more microprocessors, one or │
│ more microprocessors; one or more switches, the one or more switches comprising at │
│ least a leaf switch, wherein each of the one or more switches comprise a plurality of │
│ ports; a plurality of host channel adapters, wherein each of the host channel adapters │
│ comprise at least one virtual function, at least one virtual switch, and at least one │ 1910
│ physical function, and wherein the plurality of host channel adapters are interconnected │
│ via the one or more switches; a plurality of hypervisors, wherein each of the plurality of │
│ hypervisors are associated with at least one host channel adapter of the plurality of host │
│ channel adapters, and a plurality of virtual machines, wherein each of the plurality of │
│ virtual machines are associated with at least one virtual function. │
└─────────────────────────────────────────────────────────────────────────┘
                                      │
                                      ▼
┌─────────────────────────────────────────────────────────────────────────┐
│ Arranging the plurality of host channel adapters with one or more of a virtual switch with │
│ prepopulated local identifiers (LIDs) architecture or a virtual switch with dynamic LID │ 1920
│ assignment architecture. │
└─────────────────────────────────────────────────────────────────────────┘
                                      │
                                      ▼
┌─────────────────────────────────────────────────────────────────────────┐
│ Assigning each of the virtual switches a pLID of a plurality of pLIDs, the assigned pLID │ 1930
│ corresponding to a pLID of an associated physical function. │
└─────────────────────────────────────────────────────────────────────────┘
                                      │
                                      ▼
┌─────────────────────────────────────────────────────────────────────────┐
│ Assigning each of the plurality of virtual machines a vLID of a plurality of vLIDs; wherein │ 1940
│ an LID space comprises the plurality of pLIDs and the plurality of vLIDs. │
└─────────────────────────────────────────────────────────────────────────┘
```

FIGURE 19

SYSTEM AND METHOD FOR EFFICIENT VIRTUALIZATION IN LOSSLESS INTERCONNECTION NETWORKS

CLAIM OF PRIORITY AND CROSS REFERENCE TO RELATED APPLICATIONS

This application is a continuation of and claims the benefit of priority to U.S. Patent Applications entitled "SYSTEM AND METHOD FOR EFFICIENT VIRTUALIZATION IN LOSSLESS INTERCONNECTION NETWORKS", application Ser. No. 16/051,187, filed Jul. 31, 2018, which application is a continuation of and claims the benefit of priority to U.S. Patent Applications entitled "SYSTEM AND METHOD FOR EFFICIENT VIRTUALIZATION IN LOSSLESS INTERCONNECTION NETWORKS", application Ser. No. 15/210,599, filed on Jul. 14, 2016, which application claims the benefit of priority to U.S. Provisional Patent Application entitled "SYSTEM AND METHOD FOR EFFICIENT VIRTUALIZATION IN LOSSLESS INTERCONNECTION NETWORKS", Application No. 62/259,321, filed on Nov. 24, 2015, U.S. Provisional Patent Application entitled "SYSTEM AND METHOD FOR EFFICIENT VIRTUALIZATION IN LOSSLESS INTERCONNECTION NETWORKS", Application No. 62/259,831, filed on Nov. 25, 2015, and to U.S. Provisional Patent Application entitled "SYSTEM AND METHOD FOR EFFICIENT VIRTUALIZATION IN LOSSLESS INTERCONNECTION NETWORKS", Application No. 62/261,103, filed on Nov. 30, 2015; this application is related to U.S. Patent Applications entitled "SYSTEM AND METHOD FOR PROVIDING AN INFINIBAND SR-IOV vSWITCH ARCHITECTURE FOR A HIGH PERFORMANCE CLOUD COMPUTING ENVIRONMENT", application Ser. No. 15/050,901, filed Feb. 23, 2016, U.S. Patent Applications entitled "SYSTEM AND METHOD FOR SUPPORTING LIVE MIGRATION OF VIRTUAL MACHINES IN AN INFINIBAND NETWORK", application Ser. No. 13/837,922, filed Mar. 15, 2013; U.S. Patent Applications entitled "SYSTEM AND METHOD FOR SUPPORTING LIVE MIGRATION OF VIRTUAL MACHINES IN A VIRTUALIZATION ENVIRONMENT," application Ser. No. 13/838,121, filed Mar. 15, 2013; U.S. Patent Applications entitled "SYSTEM AND METHOD FOR SUPPORTING LIVE MIGRATION OF VIRTUAL MACHINES BASED ON AN EXTENDED HOST CHANNEL ADAPTOR (HCA) MODEL," application Ser. No. 13/838,275, filed Mar. 15, 2013; U.S. Patent Applications entitled "SYSTEM AND METHOD FOR PROVIDING A SCALABLE SIGNALING MECHANISM FOR VIRTUAL MACHINE MIGRATION IN A MIDDLEWARE MACHINE ENVIRONMENT," application Ser. No. 13/838,502, filed Mar. 15, 2013; and U.S. Patent Applications entitled "SYSTEM AND METHOD FOR EFFICIENT VIRTUALIZATION IN LOSSLESS INTERCONNECTION NETWORKS", application Ser. No. 15/210,595, filed on Jul. 14, 2016, which applications are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting computer system virtualization and live migration using SR-IOV vSwitch architecture.

BACKGROUND

As larger cloud computing architectures are introduced, the performance and administrative bottlenecks associated with the traditional network and storage have become a significant problem. There has been an increased interest in using high performance lossless interconnects such as InfiniBand (IB) technology as the foundation for a cloud computing fabric. This is the general area that embodiments of the invention are intended to address.

SUMMARY

Described herein are systems and methods for supporting virtual machine migration in a subnet. An exemplary method can provide, at one or more computers, including one or more microprocessors, one or more switches, the one or more switches comprising at least a leaf switch, wherein each of the one or more switches comprise a plurality of ports, a plurality of host channel adapters, wherein each of the host channel adapters comprise at least one virtual function, at least one virtual switch, and at least one physical function, and wherein the plurality of host channel adapters are interconnected via the one or more switches, a plurality of hypervisors, wherein each of the plurality of hypervisors are associated with at least one host channel adapter of the plurality of host channel adapters, and a plurality of virtual machines, wherein each of the plurality of virtual machines are associated with at least one virtual function. The method can arrange the plurality of host channel adapters with one or more of a virtual switch with prepopulated local identifiers (LIDs) architecture or a virtual switch with dynamic LID assignment architecture. The method can assign each virtual switch with a LID, the assigned LID corresponding to a LID of an associated physical function. The method can calculate one or more linear forwarding tables based (LFTs) at least upon the LIDs assigned to each of the virtual switches, each of the one or more LFTs being associated with a switch of the one or more switches.

In accordance with an embodiment, a method can provide at one or more computers, including one or more microprocessors, one or more microprocessors; one or more switches, the one or more switches comprising at least a leaf switch, wherein each of the one or more switches comprise a plurality of ports; a plurality of host channel adapters, wherein each of the host channel adapters comprise at least one virtual function, at least one virtual switch, and at least one physical function, and wherein the plurality of host channel adapters are interconnected via the one or more switches; a plurality of hypervisors, wherein each of the plurality of hypervisors are associated with at least one host channel adapter of the plurality of host channel adapters, and a plurality of virtual machines, wherein each of the plurality of virtual machines are associated with at least one virtual function. The method can arrange the plurality of host channel adapters with one or more of a virtual switch with prepopulated local identifiers (LIDs) architecture or a virtual switch with dynamic LID assignment architecture. The method can assign each of the virtual switches a physical LID (pLID) pLID of a plurality of pLIDs, the assigned pLID corresponding to a pLID of an associated physical function. The method can also assign each of the plurality of virtual machines a virtual LID of a plurality of vLIDs, wherein an LID space comprises the plurality of pLIDs and the plurality of vLIDs.

In accordance with an embodiment, each pLID value can be represented using standard SLID and DLID fields in a Local Route Header of an InfiniBand packet. As well, each vLID value can be represented using a combination of the standard SLID and DLID fields in combination with two or more additional bits representing an extension.

BRIEF DESCRIPTION OF THE FIGURES

FIG. 9 shows an extended local route header, in accordance with an embodiment.

FIG. 10 shows two exemplary linear forwarding tables, in accordance with an embodiment.

FIG. 18 is a flow chart of a method for supporting efficient virtualization in a lossless interconnection network, in accordance with an embodiment.

FIG. 19 is a flow chart of a method for supporting efficient virtualization in a lossless interconnection network, in accordance with an embodiment.

DETAILED DESCRIPTION

Figure 1:
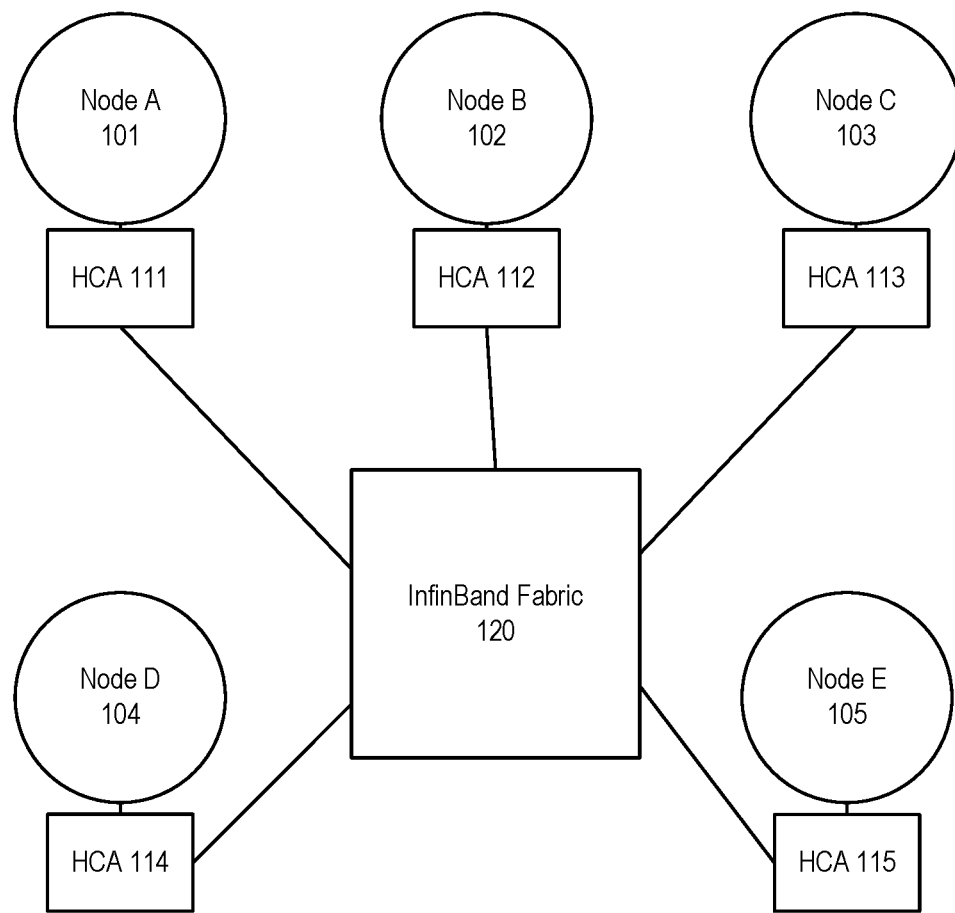
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods to support efficient virtualization in lossless interconnection networks.

The following description of the invention uses an InfiniBand™ (IB) network as an example for a high performance network. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, passthrough technology like Single-Root I/O Virtualization (SR-IOV) network adapters can be used.

In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on LFTs stored in the switches. The LFTs are calculated by the SM according to the routing mechanism in use. In a subnet, Host Channel Adapter (HCA) ports on the end nodes and switches are addressed using local identifiers (LIDs). Each entry in an LFT consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topolodies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 2:
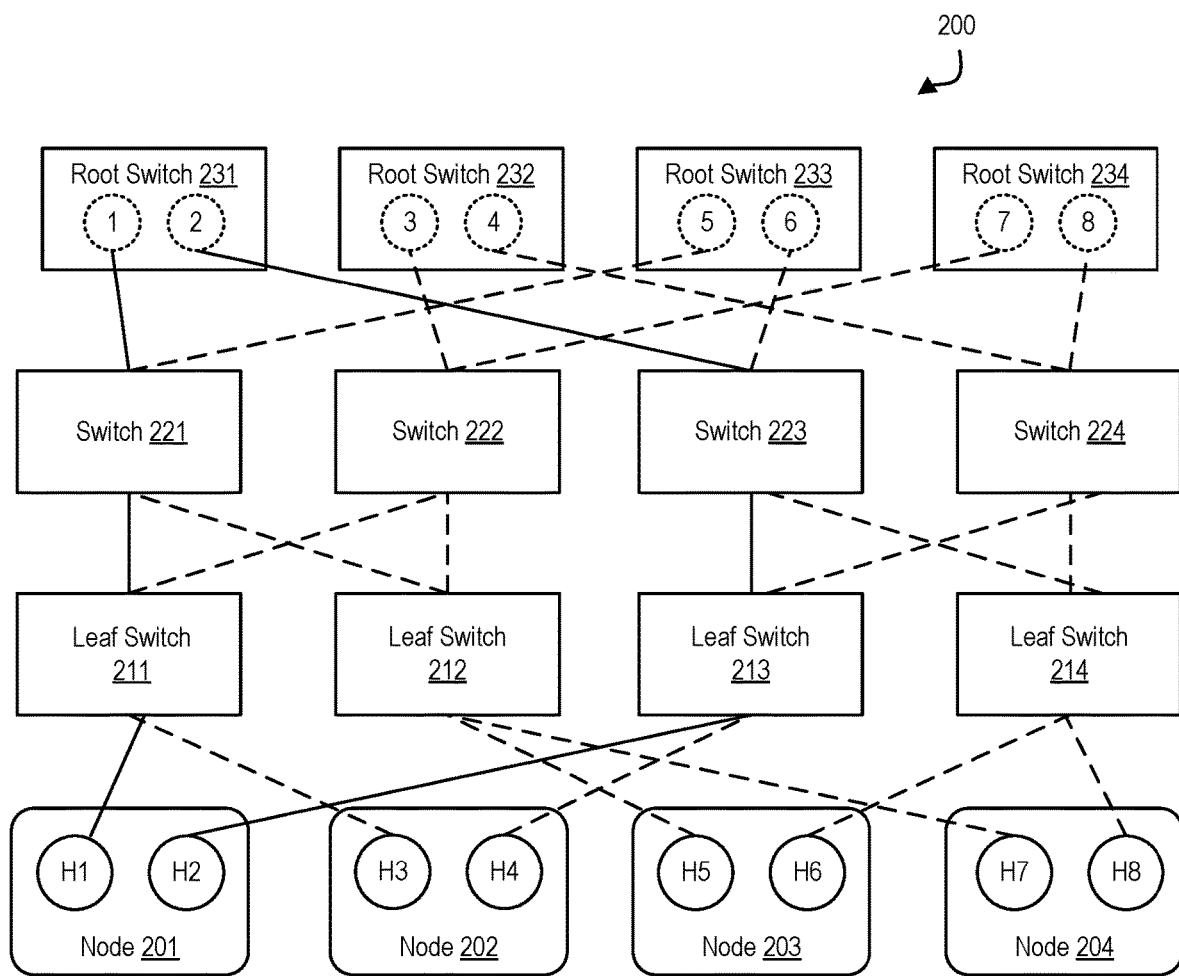
FIG. 2 shows an illustration of a tree topology in a network environment, in accordance with an embodiment.

FIG. 2 shows an illustration of a tree topology in a network environment, in accordance with an embodiment. As shown in FIG. 2, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 2, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2 k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 3:
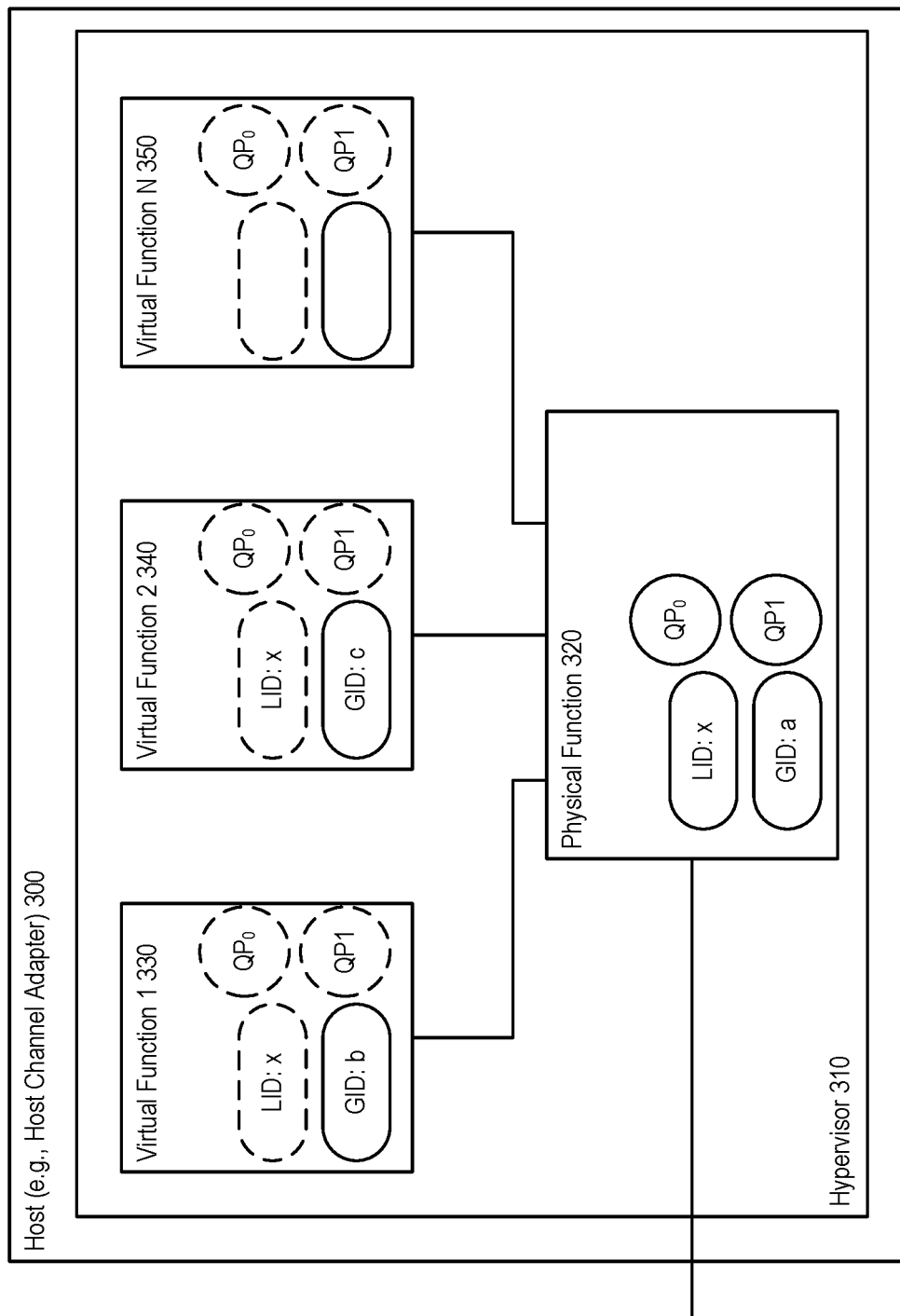
FIG. 3 shows an exemplary shared port architecture, in accordance with an embodiment.

FIG. 3 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 3, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 3, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 4:
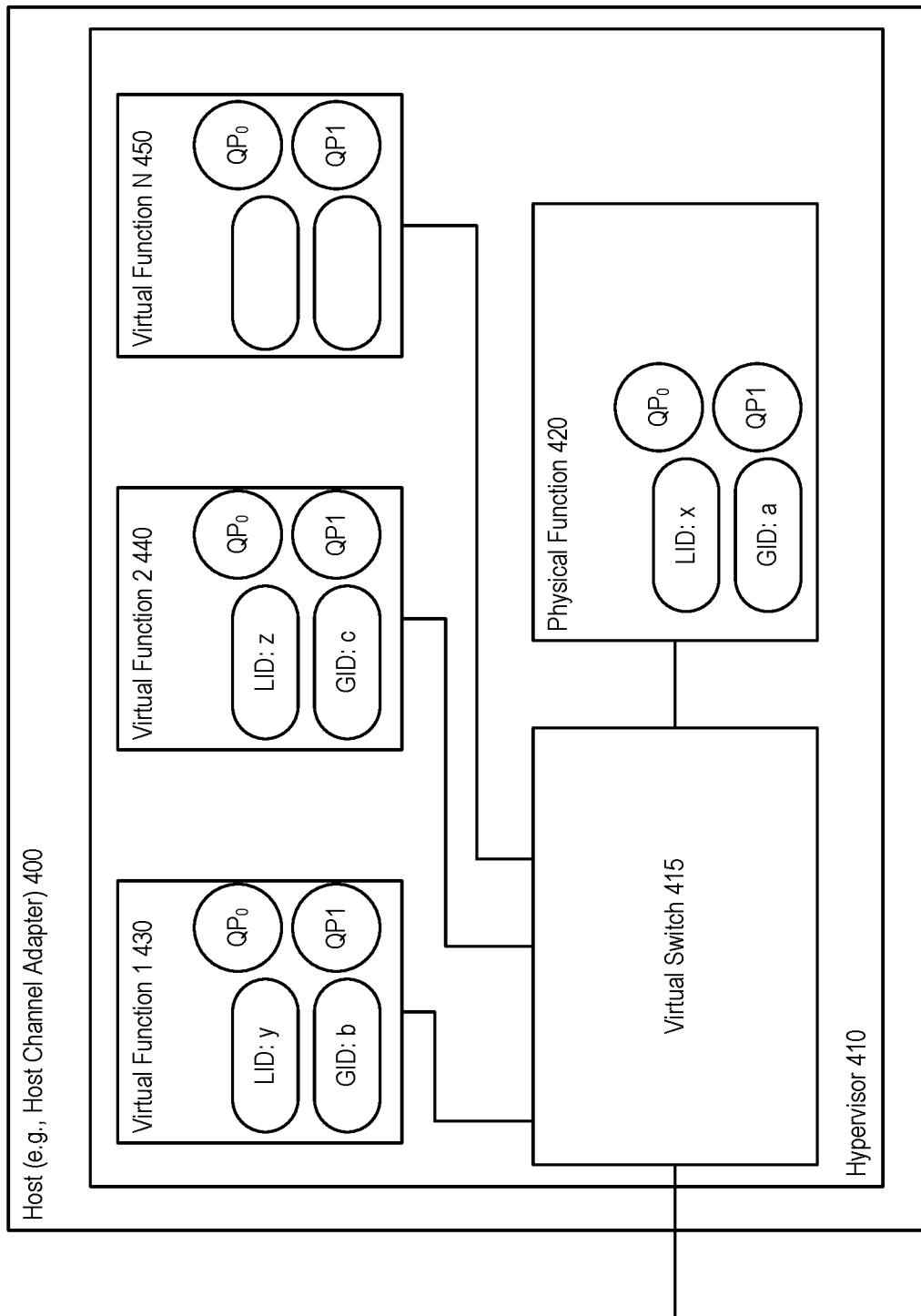
FIG. 4 shows an exemplary vSwitch architecture, in accordance with an embodiment.

FIG. 4 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 5:
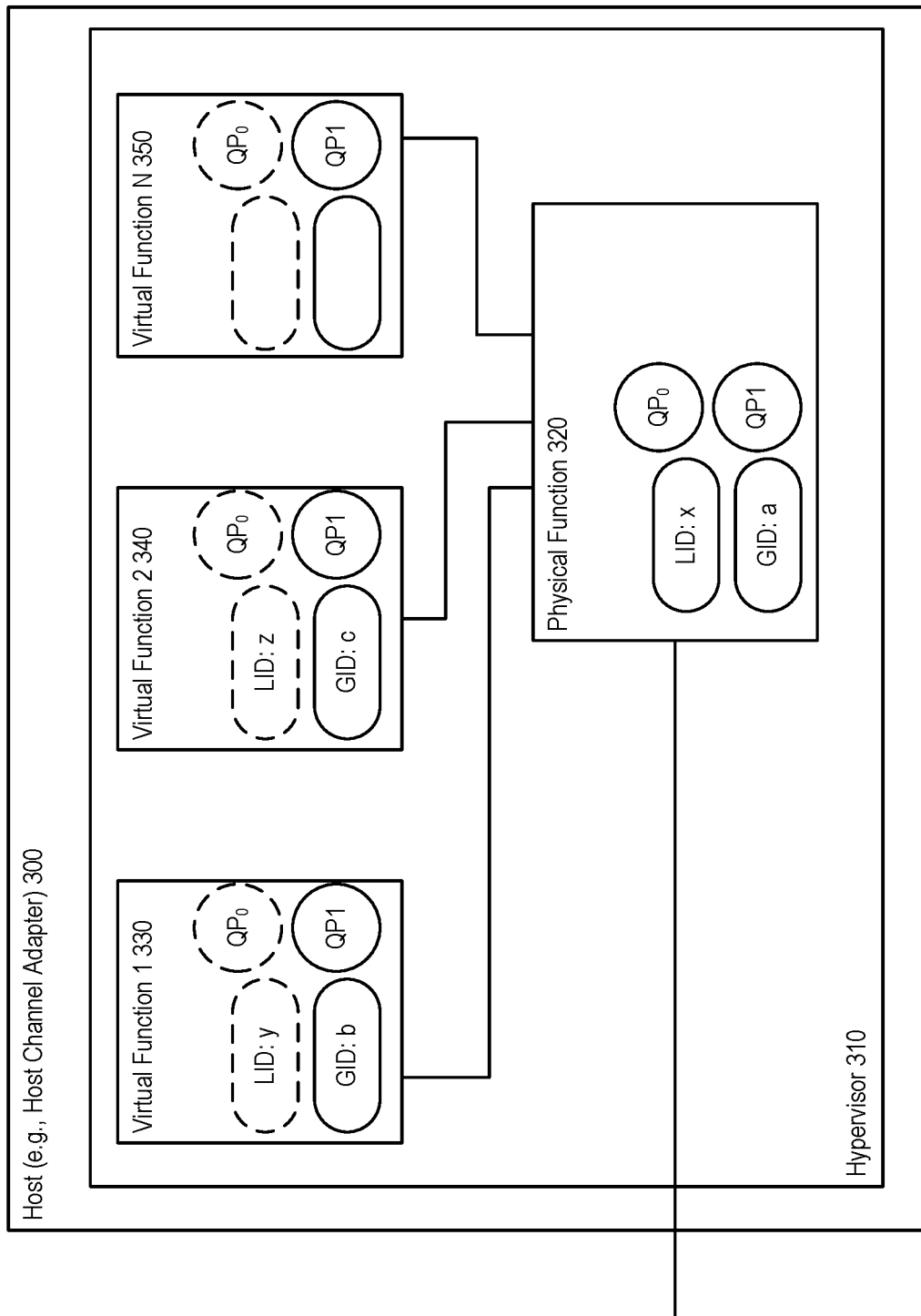
FIG. 5 shows an exemplary vPort architecture, in accordance with an embodiment.

FIG. 5 shows an exemplary vPort concept, in accordance with an embodiment.

As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 6:
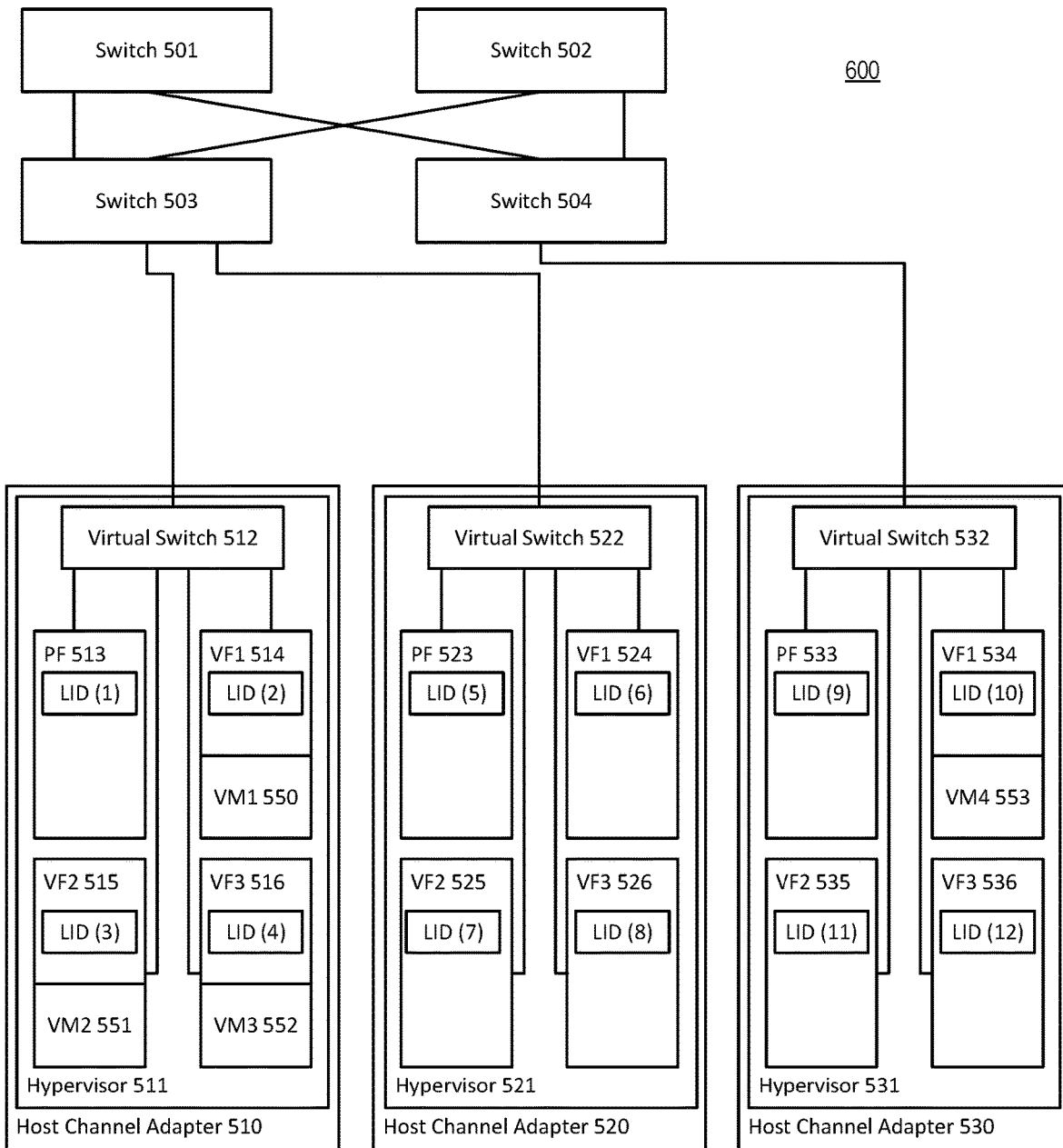
FIG. 6 shows an exemplary vSwitch architecture with prepopulated LIDs, in accordance with an embodiment.

FIG. 6 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 5, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 5.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF.

In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 7:
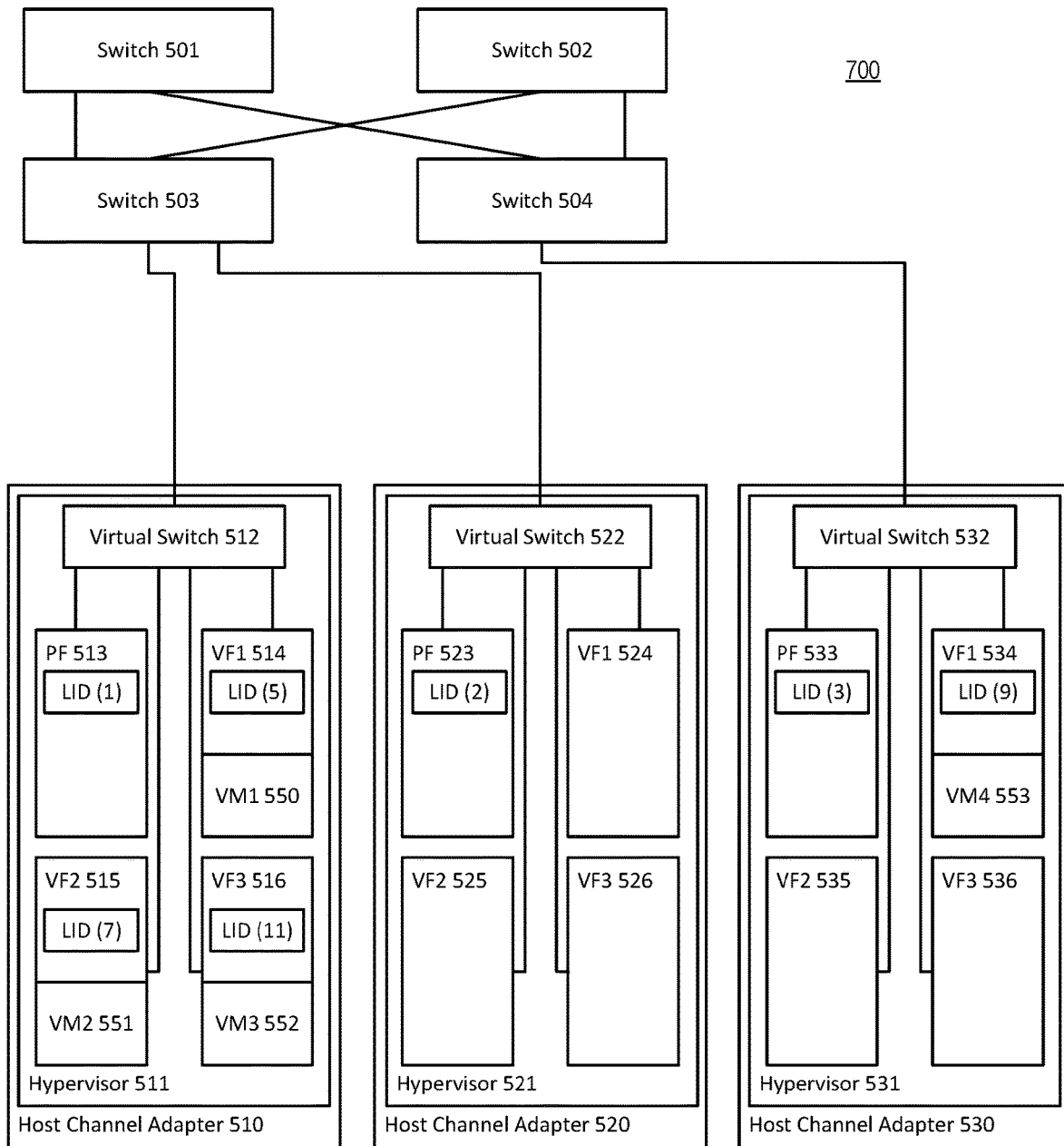
FIG. 7 shows an exemplary vSwitch architecture with dynamic LID assignment, in accordance with an embodiment.

FIG. 7 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 7, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 8:
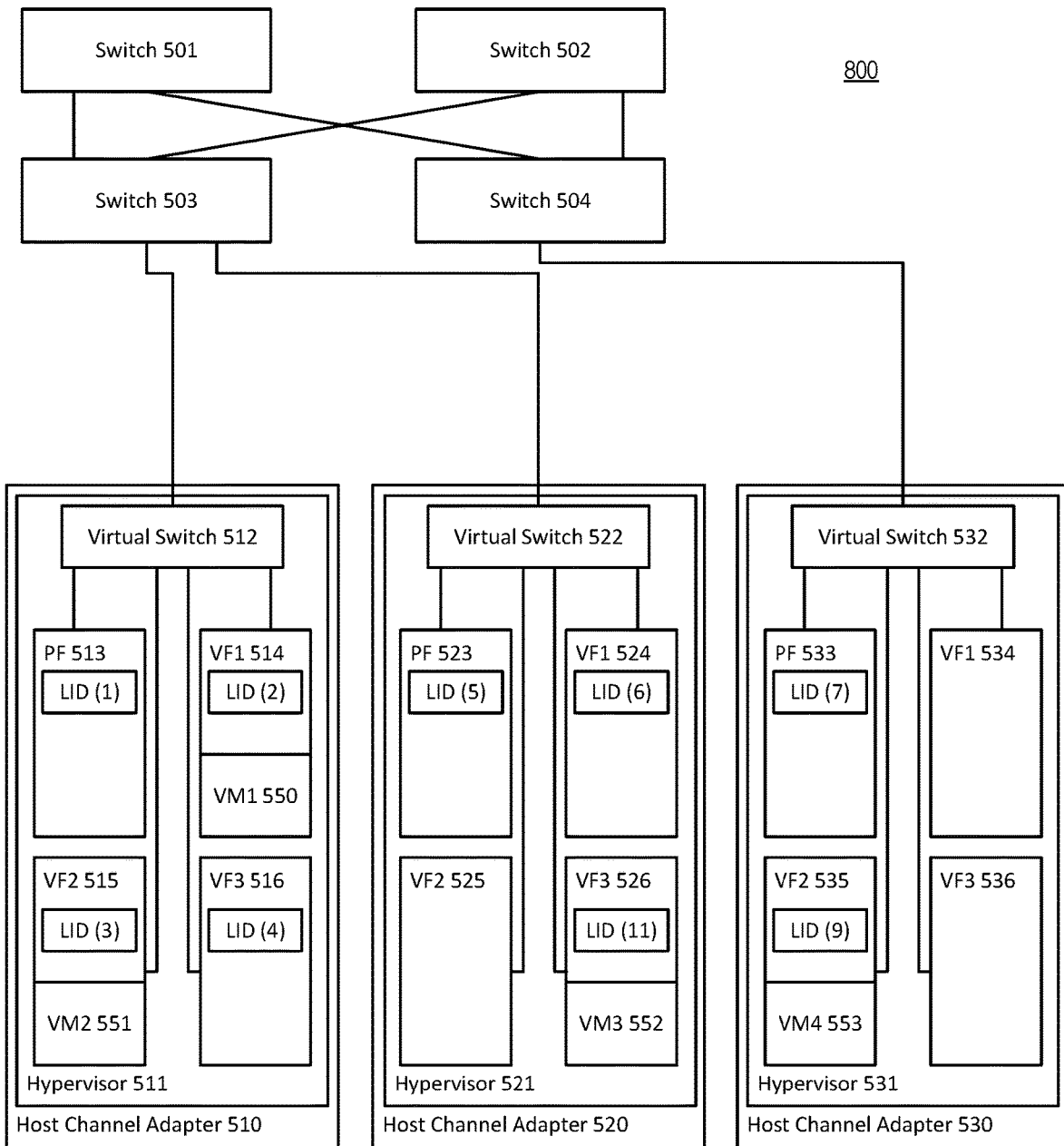
FIG. 8 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 8 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 7, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 8, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

vSwitch Scalability

In accordance with an embodiment, a concern when using the vSwitch architecture is the limited LID space. To overcome the scalability issues related to the LID space, the following three alternatives (each discussed in further detail below) can be used independently or combined: use multiple subnets, introduce a backwards compatible LID space extension, and combine the vPort and vSwitch architecture to form a lightweight-vSwitch.

In accordance with an embodiment multiple IB subnets can be used. The LID is a layer-2 address, and has to be unique within a subnet. When the IB topology spans on multiple subnets, the LID is not a limitation anymore, but if a VM needs to be migrated to a different subnet, its LID address can change since the address may already be in use in the new subnet. Spanning on multiple subnets can solve the LID limitation of a single subnet topology, but it also means that the layer-3 GID address must be used for inter-subnet routing, adding additional overhead and latency to the routing process since the layer-2 headers have to be altered by the router that is located at the edge of the subnet. Also, under the current hardware, software implementations, and loose IBA (InfiniBand Architecture) specifications, the SM of an individual subnet cannot be aware of the global topology in order to provide optimized routing paths for clusters that span on multiple subnets.

In accordance with an embodiment, a backwards compatible LID space extension in IBA can be introduced. Increasing the scarce LID space by increasing the number of LID bits to e.g. 24-bits or 32-bits can be problematic. Increasing the LID space by such an amount can result in a break with backwards compatibility as the IB Local Route Header (LRH) will have to be overhauled, and legacy hardware will not be able to work with the new standard. In accordance with an embodiment, the LID space can be extended in such a way where backwards compatibility is maintained, but still allowing new hardware to take advantage of the enhancements. The LRH has seven reserved bits that are transmitted as zero, and ignored by the receiver. By utilizing two of these reserved bits in the LRH for the Source LID (SLID) and two bits for the Destination LID (DLID), the LID space can be extended to 18 bits (quadrupling the LID space) and creating a scheme with physical LIDs (pLID) that are assigned to the physical equipment, and virtual LIDs (vLID) that are assigned to VMs.

In accordance with an embodiment, when the two additional bits are transmitted as zero, the LID is used as defined currently in IBA (48K unicast LIDs and 16K multicast LIDs), and the switches can look up their primary LFT for the forwarding of the packets. Otherwise, the LID is a vLID and it can be forwarded based on a secondary LFT that has a size of 192K. Since the vLIDs belong to VMs and VMs share the uplink with a physical node that has a pLID, the vLIDs can be excluded from the path computation phase when configuring (e.g., initial configuration) or reconfiguring (e.g., after a topology change) the network, but the secondary LFT table in the switches can be updated as described earlier above. When the SM boots and discovers the network, the SM can identify if all of the hardware supports the extended LID space. If not, the SM can fallback in a legacy compatibility mode and VMs should occupy LIDs from the pLID space.

FIG. 9 shows an extended local route header, in accordance with an embodiment. As shown in the figure, within a local route header, a virtual lane (VL) 900 comprising 4 bits, a link version (Lver) 901 comprising 4 bits, a service level (SL) 902 comprising 4 bits, a LID extension flag (LEXTF) 903 comprising 1 bit, a first reserved bit (R1) 904 comprising 1 bit, a link next header (LNH) 905 comprising 2 bits, a destination local ID (DLID) 906 comprising 16 bits, a DLID prefix extension (DPF) 907 comprising 2 bits, a SLID prefix extension (SPF) 908 comprising 2 bits, a second reserve bit (R2) 909 comprising 1 bit, a packet length (PktLen) 910 comprising 11 bits, and a source local ID (SLID) 911 comprising 16 bits. In accordance with an embodiment, both reserved bits 904 and 909 can be set to zero.

In accordance with an embodiment, as described above, the LRH shown in FIG. 9 utilizes four of the seven (original) reserved bits as prefix extensions for the destination local ID 907 and the source local ID 908. When utilized, in connection with the LID extension flag, this signals that that LRH is used in connection with a vLID, which can be routed via the secondary LFT in the switches. Alternatively, when the extensions 907 and 908 are transmitted as zero (and then ignored by the receiver), then the LID is associated with the pLID and is used as currently defined in the IBA.

FIG. 10 shows two exemplary linear forwarding tables, in accordance with an embodiment. As shown in FIG. 10, linear forwarding table 916 is a forwarding table associated with the pLIDs. The LFT spans entries 912 (entry 0, indexed by DLID=0) to entry 913 (entry 48K−1, indexed by DLID=48K−1), where each entry in the LFT is indexed by the standard 16 bit DLID, and contains a standard IB port number. In contrast, linear forwarding table 917 is a secondary forwarding table associated with the vLIDs. The LFT spans entries 914 (entry 0, indexed by 18 bit DPF+DLID=0) to entry 915 (entry 256K−1, indexed by 18 bit DPF+DLID=256K−1), where each entry is indexed by the expanded 18 bit DPF+DLID, and contains a standard IB port number.

In accordance with an embodiment, a hybrid architecture can be used to form a lightweight-vSwitch architecture. A vSwitch architecture that is able to migrate the LID together with the migrated VMs scales well with respect to the subnet management, as there is no requirement for additional signaling in order to re-establish connectivity with the peers after the migration as opposed to a shared-LID scheme where the LID will change. On the other hand, the shared-LID schemes scale well with respect to the LID space. A hybrid vSwitch+Shared-vPort model can be implemented where the SM is aware of the available SR-IOV virtual functions in the subnet, but certain VFs can receive a dedicated LID while others are routed in a shared-LID fashion based on their GID. With some knowledge of the VM-node role, popular VMs with many peers (e.g., servers) can be assigned dedicated LIDs (e.g. in order to be considered separately while calculating routes and performing load balancing in the network), while other VMs that are not interacting with many peers or run stateless services (and do not need to be migrated, but can be re-spawned) can share the LID.

Routing Strategies for vSwitch-Based Subnets

In accordance with an embodiment, to obtain greater performance, a routing algorithm can consider the vSwitch architecture when calculating routes. In a Fat-Tree, vSwitches can be identified in the topology discovery process by the distinct property that the vSwitches have only one upward link to the corresponding leaf switch. Once the vSwitches have been identified, a routing function can generate LFTs for all the switches such that the traffic from each VM can find its path towards all other VMs in the network. Each VM has its own address, thus, each VM can be routed independently of other VMs attached to the same vSwitch. This results in a routing function that generates independent multiple paths towards vSwitches in the topology, each carrying traffic to a specific VM. One drawback of this approach is that when the VM distribution is not uniform among vSwitches, the vSwitches with more VMs are potentially assigned greater network resources. However, the single upward link from the vSwitch to the corresponding leaf switch still remains the bottleneck link shared by all the VMs attached to a particular vSwitch. As a result, sub-optimal network utilization might be obtained. The simplest and fastest routing strategy is to generate paths between all vSwitch-vSwitch pairs, and route VMs with the same paths as assigned to the corresponding vSwitches. With both prepopulated and dynamic LID assignment schemes, each vSwitch has a LID defined by the PF in the SR-IOV architecture. These PF LIDs for the vSwitches can be used to generate LFTs in the first phase of the routing, while in the second phase the LIDs of the VMs can be added to the generated LFTs. In the prepopulated LIDs scheme, the entries to the VF LIDs can be added by copying the output port of the corresponding vSwitch. Similarly, in the case of dynamic LID assignment when a new VM is booted, a new entry with the LID of the VM and the output port determined by the corresponding vSwitch is added in all LFTs. An issue with this strategy is that VMs belonging to different tenants that happen to share a vSwitch can have intrinsic interference among them, due to the sharing of the same complete path in the network. To solve this issue while still keeping high network utilization, a weighted routing scheme for virtualized subnets can be used.

In accordance with an embodiment, a weighted routing scheme for vSwitch-based virtualized subnets can be utilized. In such a mechanism, each VM on a vSwitch is assigned a parameter weight that can be considered for balancing when calculating routes. The value of the weight parameter reflects the proportion of the vSwitch to leaf switch link capacity allocated to a VM in its vSwitch. For example, a simple configuration could assign each VM a weight equals to 1/num_vms, where num_vms is the number of booted VMs on the corresponding vSwitch hypervisor. Another possible implementation could be to assign higher proportion of the vSwitch capacity to most critical VMs for prioritizing the traffic flowing towards them. However, the cumulative weight of VMs per vSwitch will be equal on all vSwitches, so the links in the topology can be balanced without being affected by the actual VM distribution. At the same time, the scheme enables multipath routing where each VM can be independently routed in the network, eliminating interference between same vSwitch VMs at the intermediate links in the topology. The scheme can be combined with per VM rate limits enforcement on each vSwitch to ensure that a VM is not allowed to exceed its allocated capacity. In addition, in the presence of multiple tenant groups in the network, techniques like tenant-aware routing can be integrated with the proposed routing scheme to provide network-wide isolation among tenants.

In accordance with an embodiment, the below is a weighted routing for IB-based Fat-Tree topologies. As the Fat-Tree routing algorithm, vSwitchFatTree recursively traverses the Fat-Tree topology to set up LFTs in all switches for the LIDs associated with each VM in the subnet. The mechanism is deterministic and supports destination-based routing in which all routes are calculated backwards starting at the destination nodes.

---

Weighted Fat-Tree routing algorithm for virtualized subnets

```
1:   procedure ROUTEVIRTUALIZEDNODES
2:     for all s ∈ leafSwitches[ ] do
3:       sort vswitches in the increasing order of connected virtual
               machines
4:       for all v ∈ vSwitches[ ] do
5:         num_vms ← GETTOTALVMS(v)
6:         vm_weight ← 1/num_vms
7:         for all vm ∈ vSwitches[ ] do
8:           vm.weight ← vm_weight
9:           s.LFT[vm.LID] ← v.port
10:          ROUTEDOWNGOINGBYGOINGUP(s,vm)
11:        end for
12:      end for
13:    end for
14:  end procedure
15:  procedure ROUTEDOWNGOINGBYGOINGUP(s,vm)
16:    p ← GETLEASTLOADEDPORT(s.UpGroups[ ])
17:    rSwitch ← p.Switch
18:    rSwitch.LFT[vm.LID] ← p
19:    p.Dwn += vm.weight
20:    ROUTEUPGOINGBYGOINGDOWN(s,vm)
21:    ROUTEDOWNGOINGBYGOINGUP(rSwitch,vm)
22:  end procedure
23:  procedure ROUTEUPGOINGBYGOINGDOWN(s,vm)
24:    for all g ∈ s.DownGroups[ ] do
25:      skip g if the LFT(vm.LID) is part of this group
26:      p ← GETLEASTLOADEDPORT(g)
27:      rSwitch ← p.Switch
28:      rSwitch.LFT[vm.LID] ← p
29:      p.Up += vm.weight
30:      ROUTEUPGOINGBYGOINGDOWN(rSwitch, vm)
31:    end for
32:  end procedure
```

---

In accordance with an embodiment, the vSwitchFatTree routing mechanism shown above works as follows. Each VM is assigned a proportional weight that is calculated by dividing the weight of a vSwitch node (e.g., taken as constant 1) with the total number of running VMs on it. Different weighting schemes can also be implemented. For instance, an implementation can choose to assign weights based on VM types. However, for the sake of simplicity, this discussion focuses on a proportional weighting scheme. For each leaf switch, the routing mechanism sorts the connected vSwitches in decreasing order based on the connected VMs (line 3). The order is to ensure that VMs with higher weights are routed first, so that the routes assigned to the links can be balanced. The routing mechanism passes through all the leaf switches and their corresponding vSwitches, traversing up in the tree from each VM to allocate the path towards the VM in the tree recursively, by calling ROUTEDOWNGO-INGBYGOINGUP (line 10). The down-going port at each switch is selected based on the least-accumulated downward weight among all of the available up-going port groups (ROUTEDOWNGOINGBYGOINGUP, line 16). When a down-going port is selected, the mechanism can increase the accumulated downward weight for the corresponding port by the weight of the VM being routed (ROUTEDOWNGO-INGBYGOINGUP, line 19). After a down-going port is set, the routing mechanism can assign upward ports for routes towards the VM (and updates the corresponding upward weights for the ports) on all the connected downward switches by descending down the tree (ROUTEUPGOING-BYGOINGDOWN, line 20). The process is then repeated by moving up to the next level in the tree. When all VMs have been routed, the algorithm also routes the physical LIDs of the vSwitches the same way as the VMs, albeit with equal weights to balance vSwitch to vSwitch paths in the topology (not shown in the pseudo-code). This is desirable to provide improved balancing when a minimum reconfiguration method is used in the context of live migrations. Also, the routing path on the base physical LIDs of the vSwitches can be used as a pre-determined path to deploy new VMs quickly without the need for a reconfiguration. However, over a period of time overall routing performance will be slightly decreased over original vSwitchFatTree routing. To limit performance degradation, a reconfiguration based on vSwitchFatTree could take place offline when a certain performance threshold is crossed.

In accordance with an embodiment, the above routing mechanism can provide various improvements over regular/legacy routing mechanisms. Unlike the original Fat-Tree routing algorithm which does not consider the vSwitches or VMs in the topology, vSwitchFatTree marks vSwitches, and route each VM independently of the other VMs connected to a vSwitch. As well, to cater non-uniform VM distribution among the vSwitches, each VM is assigned a weight that corresponds to the proportion of the link it is allocated on the vSwitch. The weight is used in maintaining port counters for balancing path distribution in the Fat-Tree. The scheme also enables generalized weighted Fat-Tree routing where each VM can be assigned a weight based on its traffic profile or role priority in the network.

Figure 11:
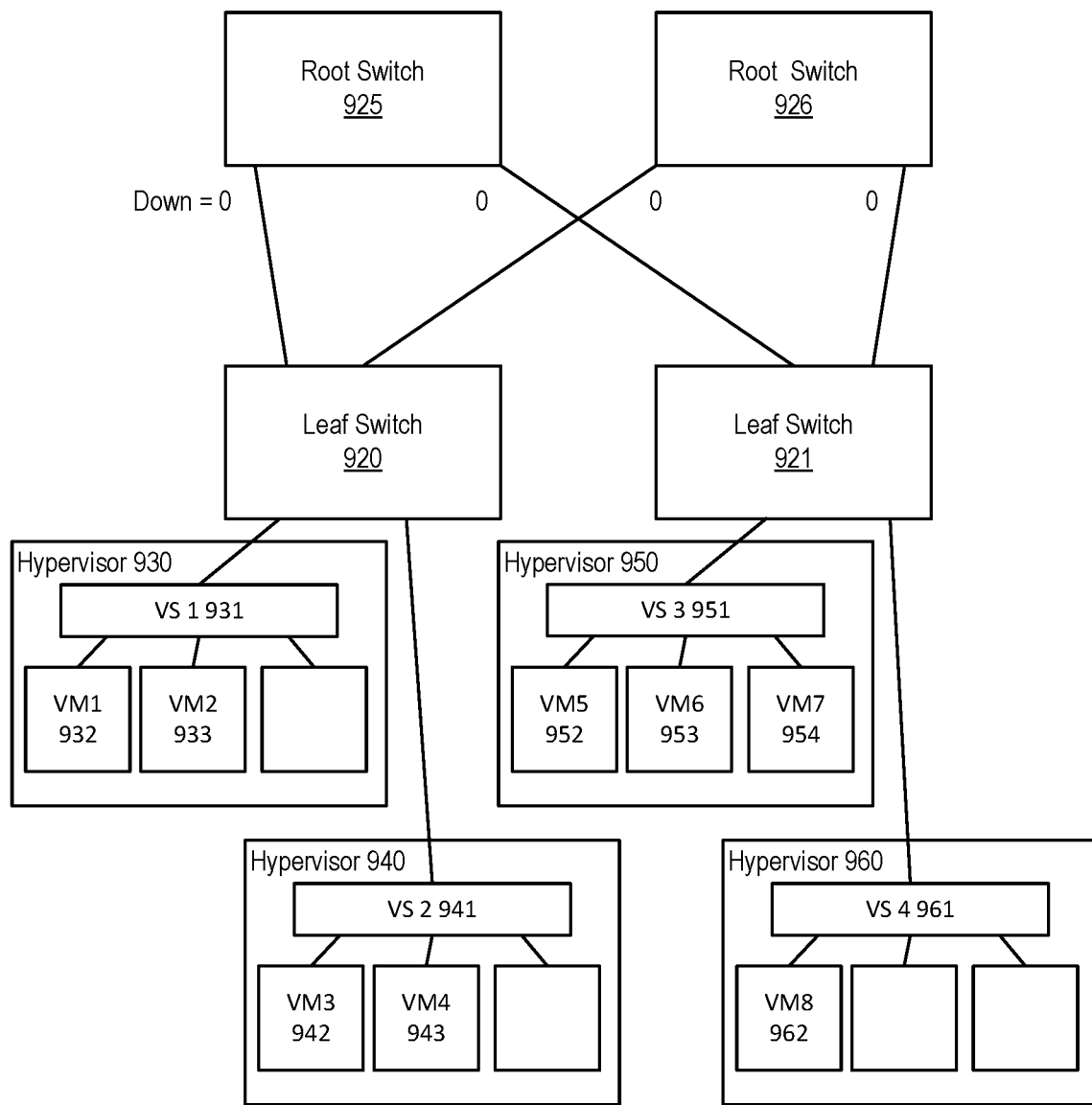
FIG. 11 shows an illustration of supporting efficient virtualization in a lossless interconnection network, in accordance with an embodiment.

FIGS. 11-14 show illustrations of supporting efficient virtualization in a lossless interconnection network, in accordance with an embodiment. Specifically, FIG. 11 shows a 2-level fat-tree topology with four switches, root switches 925-926, and leaf switches 920-921, four virtual switches, VS1 931, VS2 941, VS3 951, and VS4 961, associated with four hosts/hypervisors, 930, 940, 950, 960, where the four virtual switches provide connectivity for eight virtual machines, VM1 932, VM2 933, VM3 942, VM4 943, VM5 952, VM6 953, VM7 954, and VM8 962.

Figure 12:
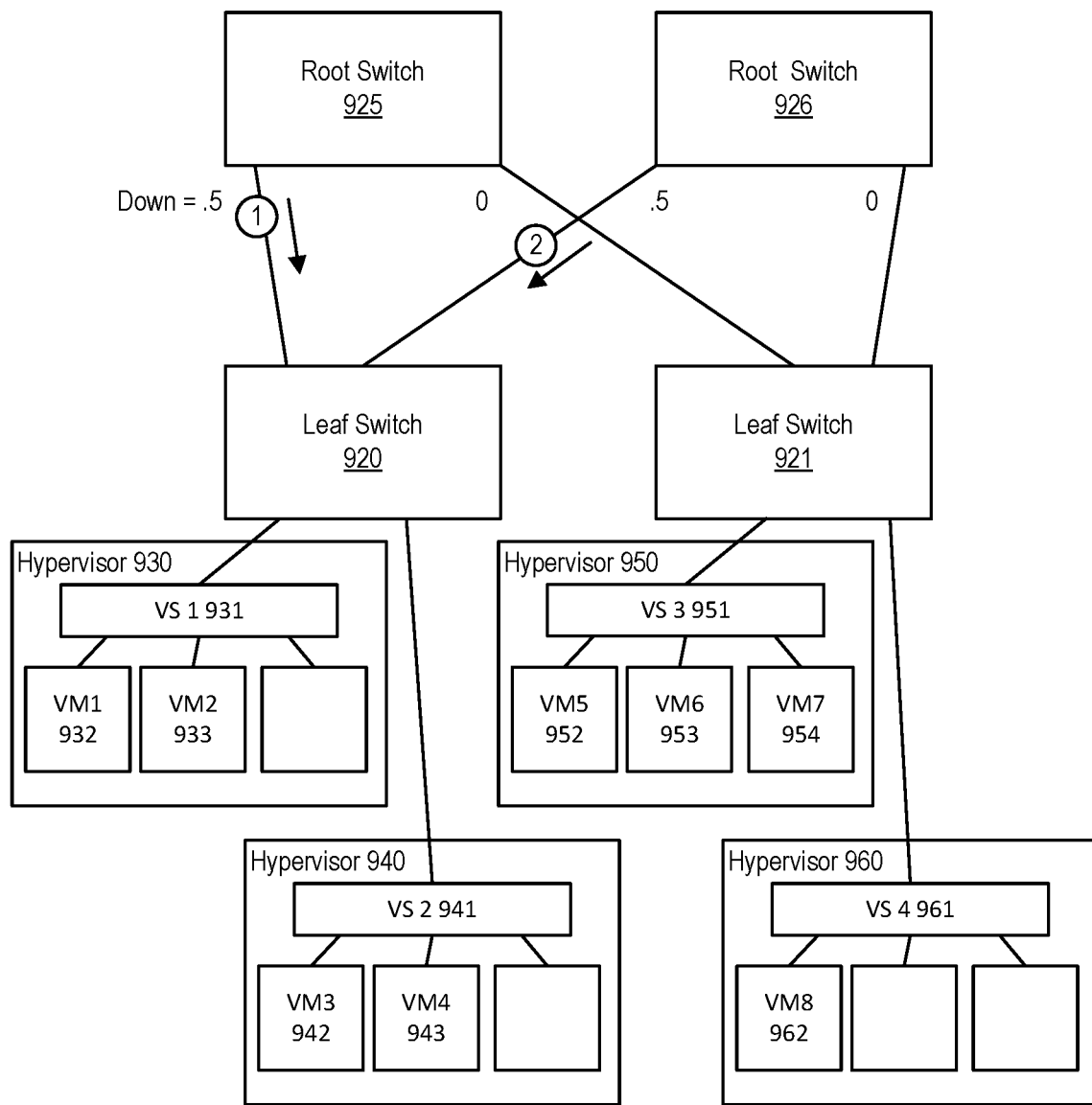
FIG. 12 shows an illustration of supporting efficient virtualization in a lossless interconnection network, in accordance with an embodiment.
Figure 13:
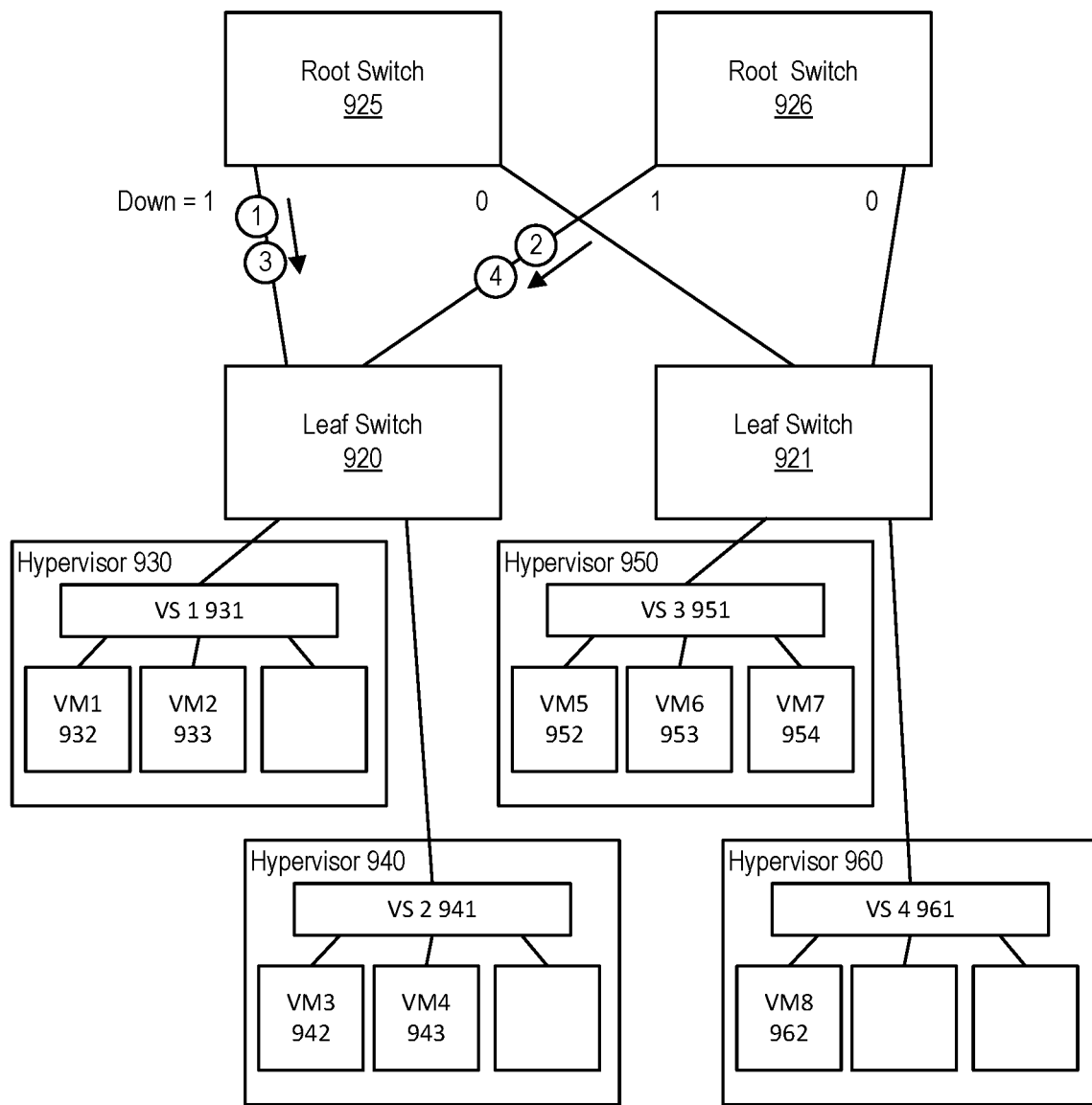
FIG. 13 shows an illustration of supporting efficient virtualization in a lossless interconnection network, in accordance with an embodiment.
Figure 14:
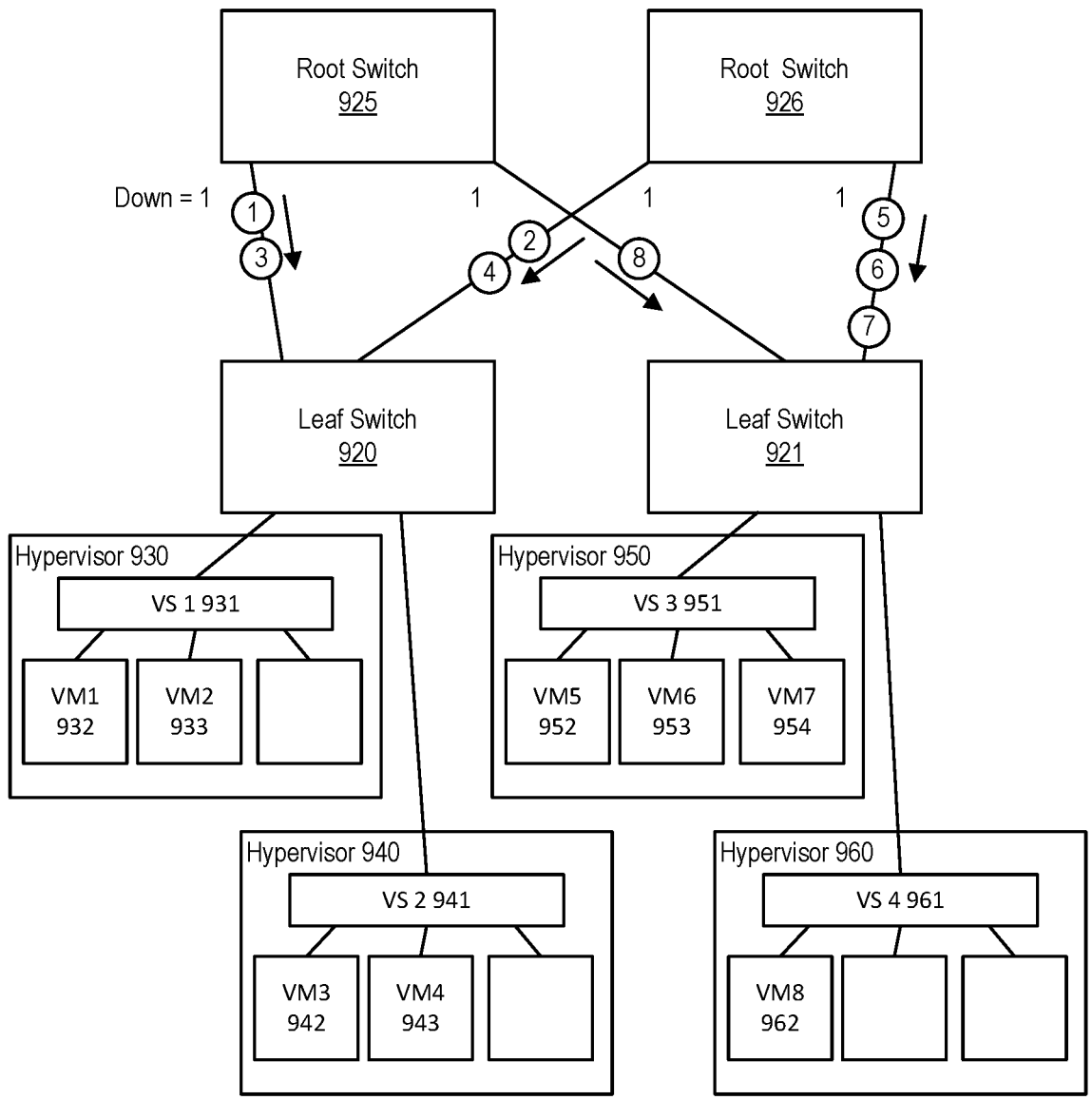
FIG. 14 shows an illustration of supporting efficient virtualization in a lossless interconnection network, in accordance with an embodiment.

To further elaborate on the vSwitchFatTree routing, consider a simple virtualized Fat-Tree topology with four end nodes (vSwitches), as shown in FIG. 11. Each of the vSwitches connected to the leaf switch 920, VS1 and VS2, have two running VMs (VM1 and VM2 for VS1, and VM3 and VM4 for VS2). The second leaf switch 921, has VS3 with three VMs (VM5, VM6, VM7), while one VM is running on the host vSwitch VS4. Each leaf switch is connected to both root switches, 925 and 926, so there are two alternative paths available to set up routes towards each VM through the roots. Routing for the VMs connected to VS1 is shown in FIG. 12 using circles showing the selected downward path from the root switches. VM 1 is routed using 925→920, while VM 2 is routed from 926→920. The corresponding downward load counters are updated on the selected links, adding 0.5 for each VM. Similarly, as shown in FIG. 13, after adding routes for VS2, VMs 3 and 4 are routed through links 925→920 and 926→920, respectively. Note that after routing all the VMs connected to leaf switch 920, the total downward load on both links is equal, even though the VMs are routed individually. The VM distribution on the vSwitches connected to the leaf switch 921 is different, so the vSwitch with one VM, VS4, will be routed first. The route 925→921 will be allocated to VM 8, while all three VMs connected to VS3 will be routed from 926→921 to keep the accumulated load on both downgoing links balanced. The final routing, shown in FIG. 14, has balanced load on each of the links together with independent routes towards VMs wherever possible, given the VM distribution in the topology.

Minimum Overhead Reconfiguration on Virtual Machine Live Migration

In accordance with an embodiment, a dynamic reconfiguration mechanism, which can be abbreviated as ItRC (Iterative Reconfiguration), iterates through all of the switches and updates the routes if necessary when a VM is migrated. However, depending on the existing LFTs (i.e., those LFTs already calculated and existing in each switch within the subnet) in the subnet, only a subset of the switches actually needs to be updated.

Figure 15:
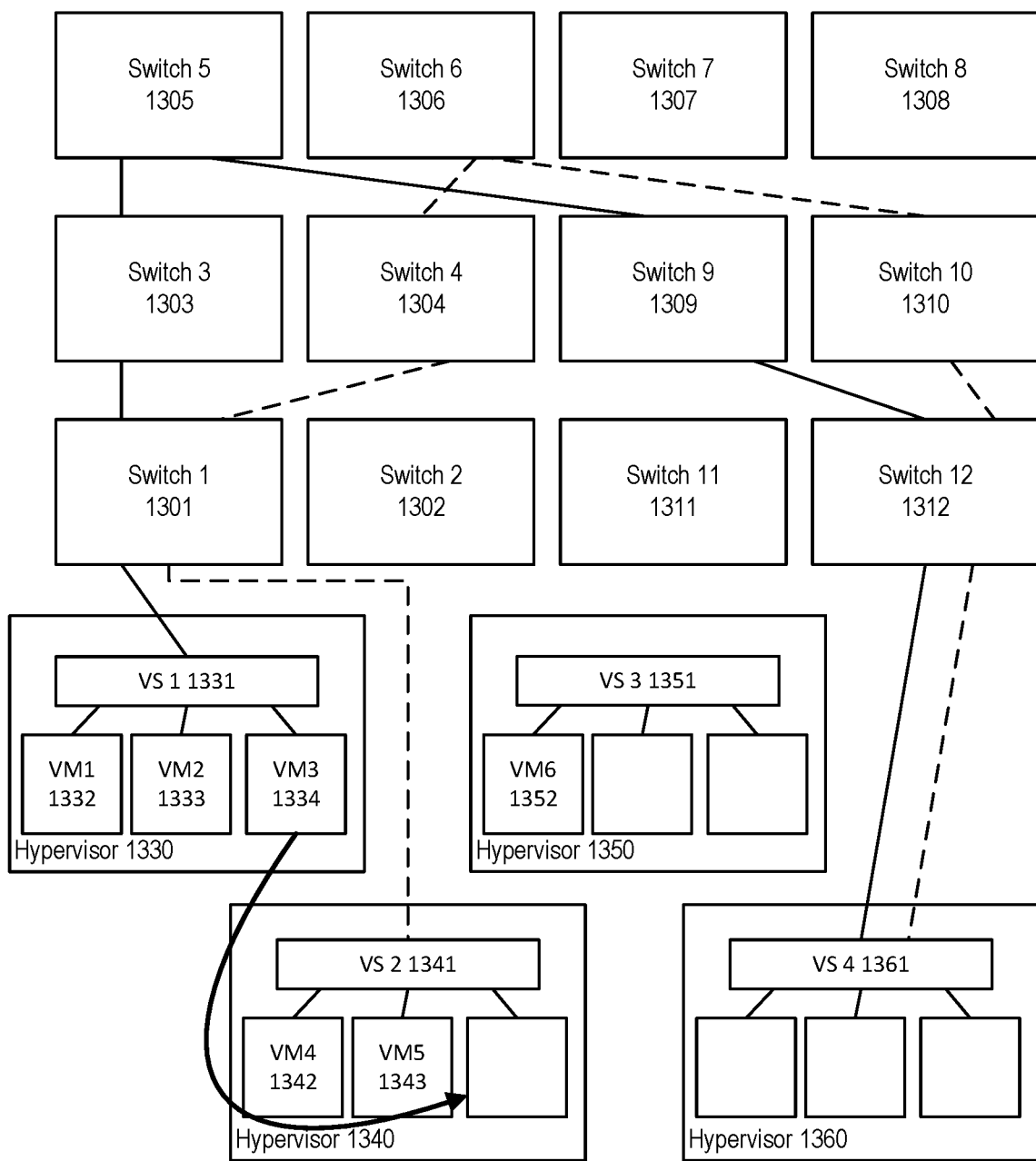
FIG. 15 illustrates a potential virtual machine migration, in accordance with an embodiment.

FIG. 15 illustrates a potential virtual machine migration, in accordance with an embodiment. More specifically, FIG. 15 illustrates a special case of the migration of a VM within a leaf switch where regardless of the network topology, only the corresponding leaf switch needs an LFT update.

As shown in FIG. 15, a subnet can comprise a number of switches, switch 1-switch 12, 1301-1312. Some of these switches can comprise leaf switches, such as switch 1 1301, switch 2 1302, Switch 11 1311, and switch 12 1312. The subnet can additionally comprise a number of host/hypervisors 1330, 1340, 1350, and 1360, a number of virtual switches VS 1 1331, VS 2 1341, VS 3 1351, and VS 4 1361. The various host/hypervisors can, via virtual functions, host virtual machines within the subnet, such as VM1 1332, VM2 1333, VM3 1334, VM4 1342, VM5 1343, and VM6 1352.

In accordance with an embodiment, when VM3 migrates (as shown by the bold arrow) from hypervisor 1330 to attach to the free virtual function at hypervisor 1340, only the LFT at leaf switch 1 1301 needs to be updated because both hypervisors are connected to the same leaf switch, and the local changes will not affect the rest of the network. For example, an initial routing algorithm determines that the traffic from hypervisor 1360 towards hypervisor 1330 follows a first path marked by the solid lines (i.e., 12→9→5→3→1). As well, traffic from hypervisor 1360 towards hypervisor 1340 follows a second path marked by dashed lines (i.e., 12→10→6→4→1). When VM3 is migrated and ItRC is used to reconfigure the network, traffic towards VM3 follows the first path towards hypervisor 1330 before the migration, and would follow the second path towards hypervisor 1340 after the migration. In this situation, the ItRC method will update half of the total switches (6/12) given that the Fat-Tree routing algorithm was used for the initial routing, however, only the single leaf switch needs to be updated to keep the migrated VM connected.

In accordance with an embodiment, by limiting the number of switch updates after a VM migration, the network can be reconfigured quicker and the time and overhead needed over a traditional routing update can be reduced. This can be achieved via a topology-aware fast reconfiguration method for supporting VM migrations on Fat-Trees, called FTreeMinRC, based on a topology-agnostic skyline technique.

Sub-Trees and Switch Tuples in Fat-Trees

In accordance with an embodiment, the following description utilizes a minimum overhead network reconfiguration method, FTreeMinRC, using XGFTs as an exemplary Fat-Tree network. However, the concepts presented here are also valid for PGFTs and RLFT. An XGFT(n; $m_1, \ldots, m_n$; $w_1, \ldots, w_n$) is a Fat-Tree with n+1 level of nodes. Levels are denoted from 0 to n, with compute nodes at level n, and switches at all other levels. Except for the compute nodes which do not have children, all nodes at level i, $0 \leq i \leq n-1$, have $m_i$ child nodes. Similarly, except for the root switches which do not have parents, all other nodes at level i, $1 \leq i \leq n$, have $w_i+1$ parent nodes.

An XGFT(n+1; $m_1, \ldots, m_{n+1}$; $w_1, \ldots, w_{n+1}$) is constructed recursively by connecting $m_n$ distinct copies of the XGFT(n+1; $m_1, \ldots m_n$; $w_1 \ldots, w_n$) with $\pi_{i=0}^{n+1} w_i$ additional switches at the new top level. By using this definition, the following properties apply: For n>0, each XGFT with n+1 levels is made up of $m_n$ sub-trees (i.e., for each sub-tree with n levels in an XGFT of l levels, l>n, there is one immediate super-tree with n+1 levels, that connects $m_n$ n-level sub-trees). As well, from a network connectivity perspective, each sub-tree in an XGFT can be considered as a distinct XGFT, and the top-level switches in the sub-tree defines its skyline towards its immediate super-tree.

In accordance with an embodiment, Each switch in an XGFT with n+1 levels can be denoted by a unique n-tuple, $(l, x_1, x_2, \ldots, b_l, \ldots, x_n)$. The left most tuple value, l, denotes the level at which the tree is located, while the rest of the values, $x_1, x_2, \ldots, x_n$, represent the location of the switch in the tree corresponding to the other switches. In particular, a switch A at level l, $(l, a_1, \ldots, a_i, \ldots, a_n)$, is connected to a switch B at level l+1, $(l+1, b_1, \ldots, b_l, b_{i+1} \ldots, b_n)$ if and only if $a_i = b_i$ for all the values except for i=l+1.

Figure 16:
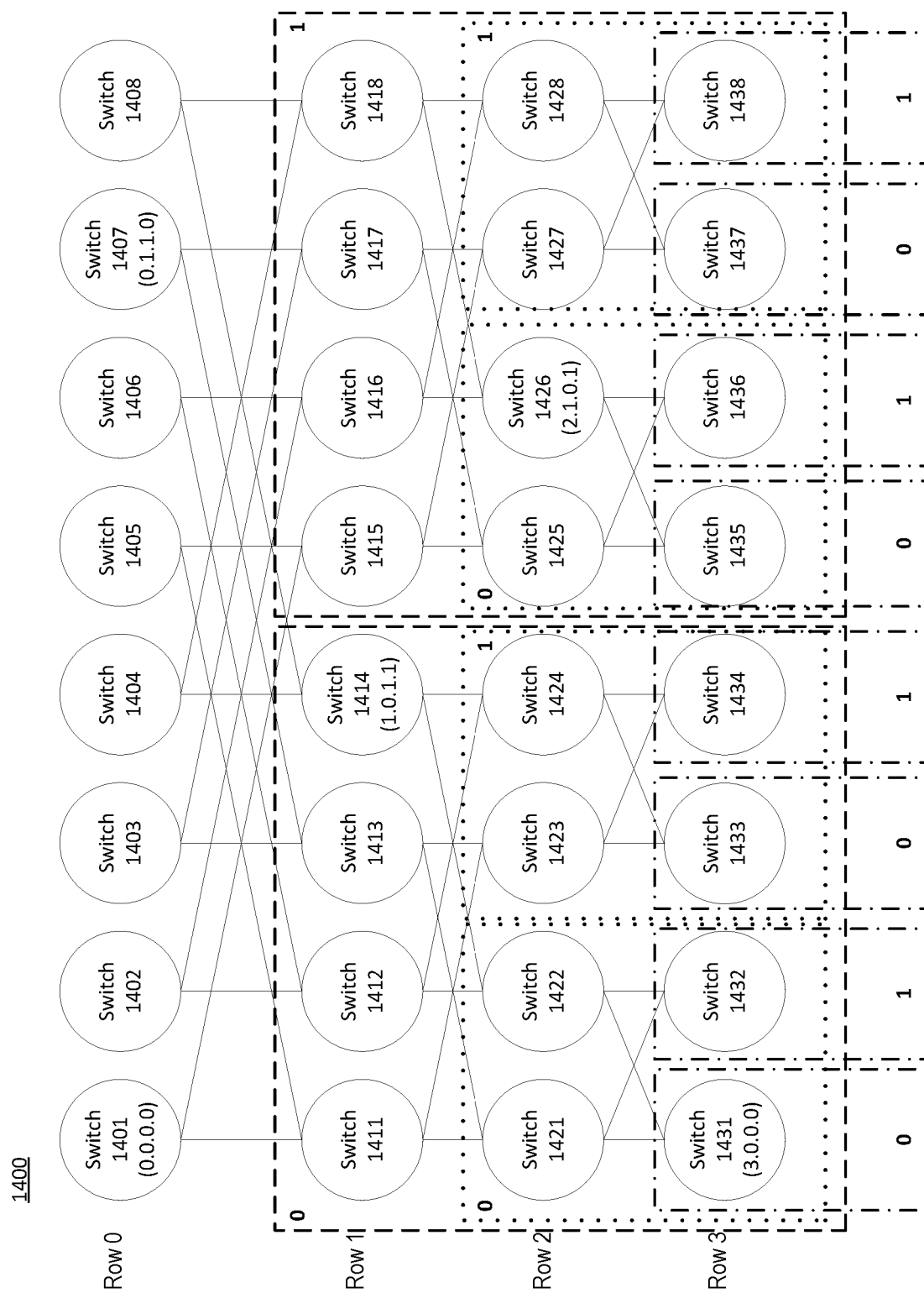
FIG. 16 illustrates switch tuples, in accordance with an embodiment.

FIG. 16 illustrates switch tuples, in accordance with an embodiment. More specifically, the figure illustrates switch tuples as allocated by the OpenSM's Fat-Tree routing algorithm implemented for an example Fat-Tree, XGFT(4; 2, 2, 2, 2; 2, 2, 2, 1). The Fat-Tree 1400 can comprise switches 1401-1408, 1411-1418, 1421-1428, and 1431-1438. As the Fat-Tree has n=4 switch levels (marked as row 0 at the root level, until row 3 at the leaf level), the Fat-Tree is composed of $m_1=2$ first-level sub-trees with n'=n−1=3 switch levels each. This is shown in the figure by two boxes defined by a dashed line that enclose the switches from levels 1 to 3, each first-level sub-tree receiving an identifier of 0 or 1. Each of those first-level sub-trees is composed of $m_2=2$ second-level sub-trees with n"=n'−1=2 switch levels each above the leaf switches. This is shown in the figure by four boxes defined by a dotted line that enclose the switches from levels 2 to 3, each second-level sub-tree receiving an identifier of 0 or 1. Similarly, each of the leaf switches can also be considered as a sub-tree, shown in the figure by eight boxes defined by a dash-dot line, and each of these sub trees receiving an identifier of 0 or 1.

In accordance with an embodiment, and as exemplified din the figure, tuples, such as four-number tuples, can be assigned to the various switches, each number of the tuple indicating a specific sub-tree correspondence for the position of each value in the tuple. For example, switch 1413 (which can be referred to as Switch 1_3) can be assigned with tuple 1.0.1.1, representing its location at level 1 and 0th first-level sub-tree.

Fat-Tree Aware Minimum Reconfiguration with FTreeMinRC in the Context of Live Migration In accordance with an embodiment, switch tuples encode information about the location of the switch in correspondence to the sub-trees in the topology. FTreeMinRC can use this information to enable quick reconfiguration in the case of live VM migration. The tuple information can be used to find the skyline with the least number of switches that needs to be reconfigured by the SM when a VM is migrated. In particular, when a VM is migrated between two hypervisors in a Fat-Tree topology, the skyline representing the minimum number of switches that needs to be updated, is formed by all top-level switches of all the sub-trees that are involved in the migration.

In accordance with an embodiment, when a VM is live migrated, a switch-marking mechanism can start from both leaf switches where the source and the destination hypervisors are connected, and compares the tuples of the switches.

If the tuples match then the mechanism can determine that the VM is being migrated within the leaf switch. Thus, only the corresponding leaf switch is marked for reconfiguration. However, when tuples do not match, the upward links from both the source and the destination leaf switches are traced. The switches that are located one level up are the top-level switches of the immediate super-tree that the leaf-level sub-trees are connected to, and the only possible hops before reaching the leaf-switches when traversing the tree downwards. The mechanism can then compare the source and destination leaf switches tuple with the newly traced switches, after adjusting the tuple value to reflect the current level and the values that correspond to the sub-tree(s) of the current tree are wild-carded. Again, the traced switches (that are top-level switches for a corresponding sub-tree) are marked for updating, and if the comparisons from both the source and destination switch tuples match the tuples of all the traced switches, the tracing stops. Otherwise, the same procedure is repeated until the mechanism locates common ancestor switches from both ends. In the worst case, the mechanism can stop after reaching the root switches of the Fat-Tree topology. Since all the upward-paths are traced starting from the leaf level, and the skyline switches of the consecutive sub-trees are marked, when the mechanism reaches the topmost sub-tree that is affected by the migration, the mechanism has already selected on the way all of the switches that are potential traffic gateways towards the lower level switches, and the hypervisors that participate in the live migration. Thus, the mechanism has marked all the switches that form the skyline of the affected part of the network due to the live migration.

In accordance with an embodiment, the switch marking mechanism finds the minimum number of switches that needs to be updated from a physical connectivity perspective. However, it can occur that not all of these switches contain active paths calculated by the routing algorithm towards the LIDs affected by the reconfiguration. Thus, the switches that contain the active routes are prioritized in the updating procedure, while the rest of the switches that have the secondary routes can be updated later.

In accordance with an embodiment, a Fat-Tree routing mechanism always routes traffic to a given destination through the same root switch. As only a single path between a root switch and an end node exists in the topology, once the root switch is located that has been selected to represent the given end node, the intermediate switches can be found that are used to route traffic to the end node. In order to find the active routes, a path can be traced from the source to the destination LID of the participating hypervisors and vice versa. Switches can be marked that are a subset of the switches already selected for reconfiguration, and prioritize the LFT updates of those switches. Later, to keep all the LFTs valid, the remaining selected switches can be updated.

Figure 17:
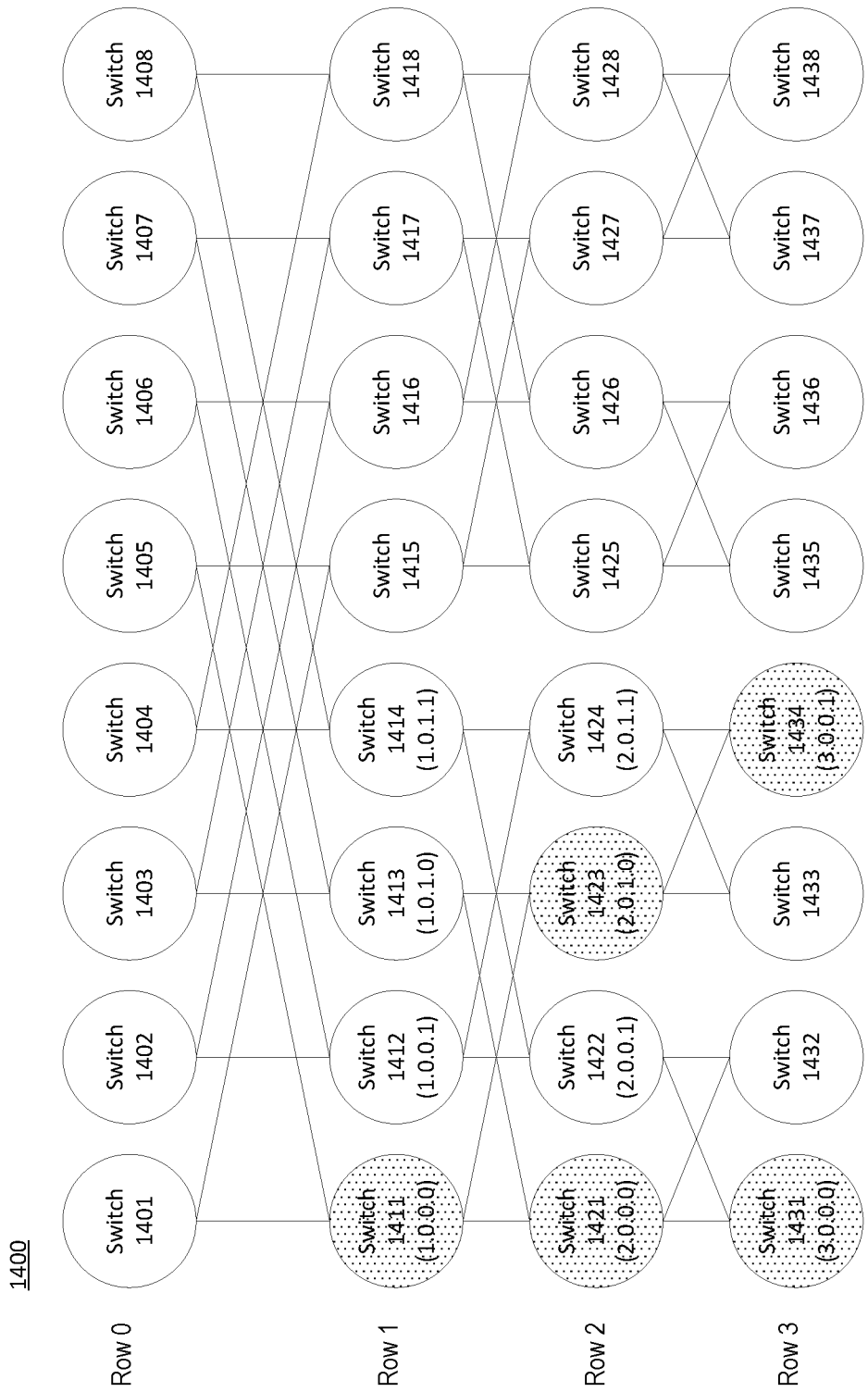
FIG. 17 illustrates a reconfiguration process, in accordance with an embodiment.

FIG. 17 illustrates a reconfiguration process, in accordance with an embodiment. The Fat-Tree 1400 can comprise switches 1401-1408, 1411-1418, 1421-1428, and 1431-1438. As the Fat-Tree has n=4 switch levels (marked as row 0 at the root level, until row 3 at the leaf level), the Fat-Tree is composed of $m_1=2$ first-level sub-trees with $n'=n-1=3$ switch levels each. Each of those first-level sub-trees is composed of $m_2=2$ second-level sub-trees with $n''=n'-1=2$ switch levels each above the leaf switches. Similarly, each of the leaf switches can also be considered as a sub-tree.

In accordance with an embodiment, FIG. 17 illustrates a situation where a VM is migrated between two hypervisors that are connected to the leaf switches with tuples 3.0.0.0 and 3.0.1.1. These two tuples are used as the basis for the comparison as the mechanism traces the paths upwards from the selected leaf switches. In this example, the common ancestor switches are found on level 1. Level 0 is the root level, and level 3 is the leaf level. The links between those switches that have the tuple information displayed are the links that can be traced throughout the execution of the mechanism, and those same switches can all be marked for update. The five of the switches highlighted (switches 1431, 1421, 1411, 1423, and 1434) and the links between them, represent the active routes and their LFT updates can be prioritized.

In accordance with an embodiment, FTreeMinRC minimizes the number of LFT updates that need to be sent to the switches, in order to provide rapid connectivity with a minimum overhead in a virtualized data center that supports live migrations.

FIG. 18 is a flow chart of a method for supporting efficient virtualization in a lossless interconnection network, in accordance with an embodiment. At step 1810, the method can provide, at one or more computers, including one or more microprocessors, one or more switches, the one or more switches comprising at least a leaf switch, wherein each of the one or more switches comprise a plurality of ports, a plurality of host channel adapters, wherein each of the host channel adapters comprise at least one virtual function, at least one virtual switch, and at least one physical function, and wherein the plurality of host channel adapters are interconnected via the one or more switches, a plurality of hypervisors, wherein each of the plurality of hypervisors are associated with at least one host channel adapter of the plurality of host channel adapters, and a plurality of virtual machines, wherein each of the plurality of virtual machines are associated with at least one virtual function.

At step 1820, the method can arrange the plurality of host channel adapters with one or more of a virtual switch with prepopulated local identifiers (LIDs) architecture or a virtual switch with dynamic LID assignment architecture.

At step 1830, the method can assign each virtual switch with a LID, the assigned LID corresponding to a LID of an associated physical function.

At step 1840, the method can calculate one or more linear forwarding tables based at least upon the LIDs assigned to each of the virtual switches, each of the one or more LFTs being associated with a switch of the one or more switches.

FIG. 19 is a flow chart of a method for supporting efficient virtualization in a lossless interconnection network, in accordance with an embodiment. At step 1910, the method can provide, at one or more computers, including one or more microprocessors, one or more microprocessors; one or more switches, the one or more switches comprising at least a leaf switch, wherein each of the one or more switches comprise a plurality of ports; a plurality of host channel adapters, wherein each of the host channel adapters comprise at least one virtual function, at least one virtual switch, and at least one physical function, and wherein the plurality of host channel adapters are interconnected via the one or more switches; a plurality of hypervisors, wherein each of the plurality of hypervisors are associated with at least one host channel adapter of the plurality of host channel adapters, and a plurality of virtual machines, wherein each of the plurality of virtual machines are associated with at least one virtual function.

At step 1920, the method can arrange the plurality of host channel adapters with one or more of a virtual switch with prepopulated local identifiers (LIDs) architecture or a virtual switch with dynamic LID assignment architecture.

At step 1930, the method can assign each of the virtual switches a pLID of a plurality of pLIDs, the assigned pLID corresponding to a pLID of an associated physical function.

At step 1940, the method can assign each of the plurality of virtual machines a vLID of a plurality of vLIDs, wherein an LID space comprises the plurality of pLIDs and the plurality of vLIDs.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting efficient virtualization in a lossless interconnection network, comprising:
   one or more microprocessors;
   a first subnet comprising a plurality of switches, wherein each of the plurality of switches are associated with a linear forwarding table (LFT) of a plurality of LFTs, and wherein each switch is assigned a switch tuple of a plurality of switch tuples;
   wherein a virtual machine performs a live migration within the first subnet, wherein during the live migration, a local identifier (LID) of the virtual machine is updated;
   wherein, as a result of the migration of the virtual machine, a set of the plurality of LFTs are updated, the set of the plurality of LFTs being determined at least based upon a comparison of at least two switch tuples of the plurality of switch tuples; and
   wherein the comparison of the at least two switch tuples comprises a comparison of a same switch tuple assigned to a same leaf switch of the plurality of switches.

2. The system of claim 1,
   wherein the live migration of the virtual machine comprises:
      migrating the virtual machine from a first host channel adapter to a second host channel adapter.

3. The system of claim 2,
   wherein the first host channel adapter and the second host channel adapter are connected to the first subnet via the same leaf switch of the plurality of switches.

4. The system of claim 1,
   wherein the set of the plurality of LFTs comprises a LFT associated with the same leaf switch.

5. The system of claim 4,
   wherein the plurality of switches are arranged in a Fat-Tree topology.

6. The system of claim 1,
   wherein each of the virtual machines is assigned a weight parameter, and
   wherein each of the weight parameters are used in calculating the one or more linear forwarding tables.

7. A method for supporting efficient virtualization in a lossless interconnection network, comprising:
   providing, at one or more computers, including one or more microprocessors;
   a first subnet comprising a plurality of switches, wherein each of the plurality of switches are associated with a linear forwarding table (LFT) of a plurality of LFTs, and wherein each switch is assigned a switch tuple of a plurality of switch tuples;

live migrating a virtual machine within the first subnet, wherein during the live migration, a local identifier (LID) of the virtual machine is updated; and updating, as a result of the migration of the virtual machine, a set of the plurality of LFTs, the set of the plurality of LFTs being determined at least based upon a comparison of at least two switch tuples of the plurality of switch tuples;

wherein the comparison of the at least two switch tuples comprises a comparison of the same switch tuple assigned to the same leaf switch of the plurality of switches.

8. The method of claim 7,
wherein the live migration of the virtual machine comprises:
  migrating the virtual machine from a first host channel adapter to a second host channel adapter.

9. The method of claim 8,
wherein the first host channel adapter and the second host channel adapter are connected to the first subnet via the same leaf switch of the plurality of switches.

10. The method of claim 7,
wherein the set of the plurality of LFTs comprises a LFT associated with the same leaf switch.

11. The method of claim 10,
wherein the plurality of switches are arranged in a Fat-Tree topology.

12. The method of claim 7,
wherein each of the virtual machines is assigned a weight parameter, and
wherein each of the weight parameters are used in calculating the one or more linear forwarding tables.

13. A non-transitory computer readable storage medium, including instructions stored thereon for supporting efficient virtualization in a lossless interconnection network which when read and executed by one or more computers cause the one or more computers to perform steps comprising:
  providing, at one or more computers, including one or more microprocessors;
  a first subnet comprising a plurality of switches, wherein each of the plurality of switches are associated with a linear forwarding table (LFT) of a plurality of LFTs, and wherein each switch is assigned a switch tuple of a plurality of switch tuples;

live migrating a virtual machine within the first subnet, wherein during the live migration, a local identifier (LID) of the virtual machine is updated; and updating, as a result of the migration of the virtual machine, a set of the plurality of LFTs, the set of the plurality of LFTs being determined at least based upon a comparison of at least two switch tuples of the plurality of switch tuples;

wherein the comparison of the at least two switch tuples comprises a comparison of the same switch tuple assigned to the same leaf switch of the plurality of switches.

14. The non-transitory computer readable storage medium of claim 13,
wherein the live migration of the virtual machine comprises:
  migrating the virtual machine from a first host channel adapter to a second host channel adapter.

15. The non-transitory computer readable storage medium of claim 14,
wherein the first host channel adapter and the second host channel adapter are connected to the first subnet via the same leaf switch of the plurality of switches.

16. The non-transitory computer readable storage medium of claim 13,
wherein the set of the plurality of LFTs comprises a LFT associated with the same leaf switch; and
wherein the plurality of switches are arranged in a Fat-Tree topology.

17. The non-transitory computer readable storage medium of claim 13,
wherein each of the virtual machines is assigned a weight parameter, and
wherein each of the weight parameters are used in calculating the one or more linear forwarding tables.

* * * * *

UNITED STATES PATENT AND TRADEMARK OFFICE
CERTIFICATE OF CORRECTION

PATENT NO. : 10,778,764 B2
APPLICATION NO. : 16/558977
DATED : September 15, 2020
INVENTOR(S) : Tasoulas et al.

It is certified that error appears in the above-identified patent and that said Letters Patent is hereby corrected as shown below:

In the Drawings

On sheet 1 of 19, in FIGURE 1, under Reference Numeral 120, Line 1, delete "InfinBand" and insert -- InfiniBand --, therefor.

In the Specification

In Column 1, Line 9, delete "Applications" and insert -- Application --, therefor.

In Column 1, Line 15, delete "Applications" and insert -- Application --, therefor.

In Column 1, Line 32, delete "Applications" and insert -- Application --, therefor.

In Column 1, Lines 37-38, delete "Applications" and insert -- Application --, therefor.

In Column 1, Line 41, delete "Applications" and insert -- Application --, therefor.

In Column 1, Line 45, delete "Applications" and insert -- Application --, therefor.

In Column 1, Line 50, delete "Applications" and insert -- Application --, therefor.

In Column 1, Line 55, delete "Applications" and insert -- Application --, therefor.

In Column 7, Line 23, delete "Topolodies" and insert -- Topologies --, therefor.

In Column 8, Line 26, delete "2 k" and insert -- 2k --, therefor.

In Column 17, Line 20, delete "that that" and insert -- that --, therefor.

In Column 21, Line 66, delete "$(n+1; m_1, \ldots, m_{n+1}; w_1, \ldots, w_{n+1})$" and insert Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*

-- $(n+1; m_1, \ldots, m_{n+1}; w_1, \ldots, w_{n+1})$ --, therefor.

In Column 22, Line 1, delete "$(n+1; m_1, \ldots m_n; w_1 \ldots, w_n)$" and insert
-- $(n+1; m_1, \ldots, m_n; w_1, \ldots, w_n)$ --, therefor.

In Column 22, Line 1, delete "$\pi_{i=0}^{n+1} w_i$" and insert -- $\prod_{i=0}^{n+1} w_i$ --, therefor.

In Column 22, Line 13, delete "$(l, x_1, x_2, \ldots, b_l, \ldots, x_n).$" and insert -- $(l, x_1, x_2, \ldots, x_n).$ --, therefor.

In Column 22, Line 17, delete "$a_i,$" and insert -- $a_l,$ --, therefor.

In Column 22, Line 19, delete "$b_{i+1}$" and insert -- $b_{l+1}$ --, therefor.